R. J. REGAN.
CHANGE MAKING MACHINE.
APPLICATION FILED MAY 26, 1915.
1,293,548.
Patented Feb. 4, 1919.
11 SHEETS—SHEET 1.
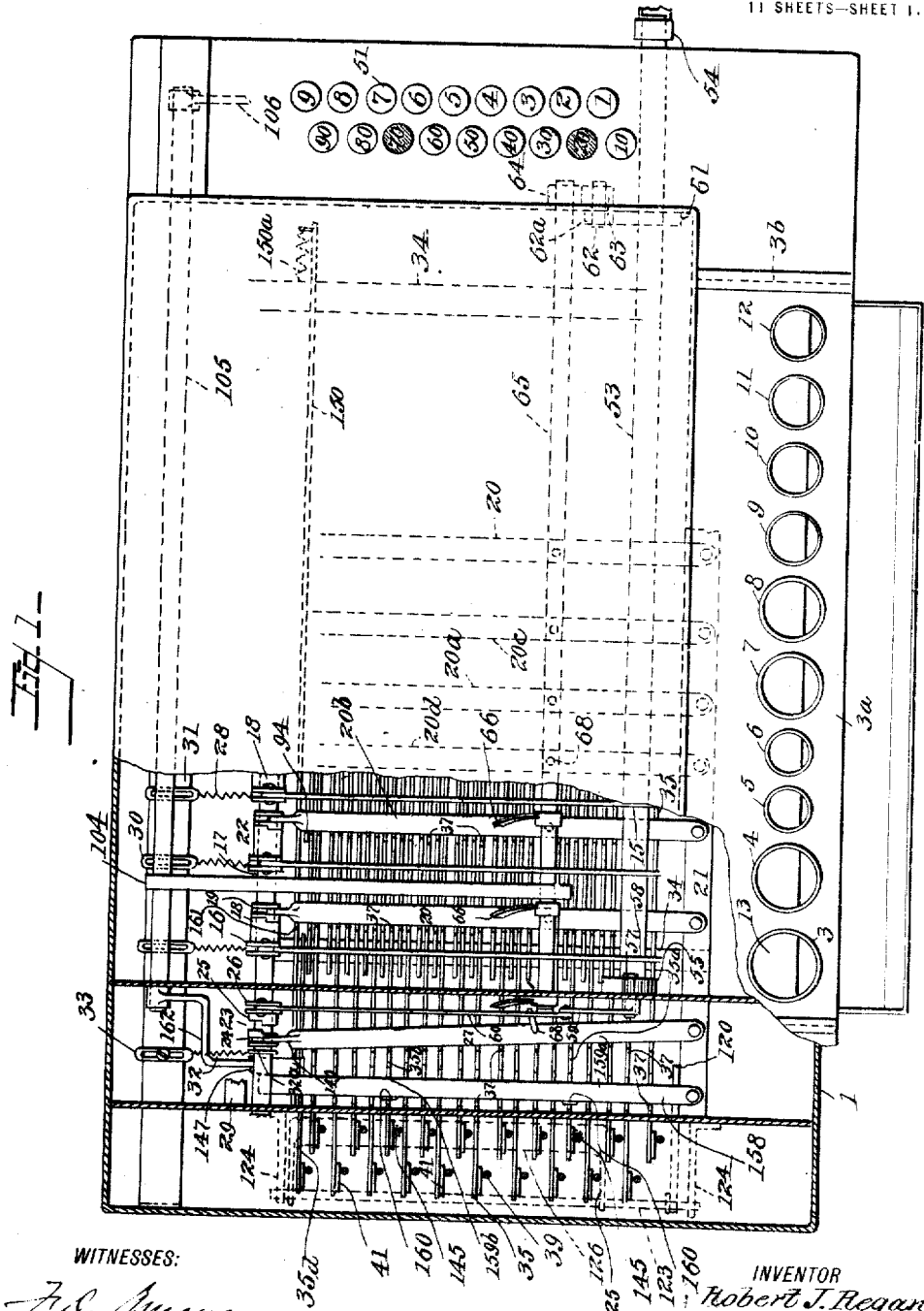
WITNESSES:
INVENTOR
Robert J. Regan
BY
Meyers, Cushman &Rea
ATTORNEYS

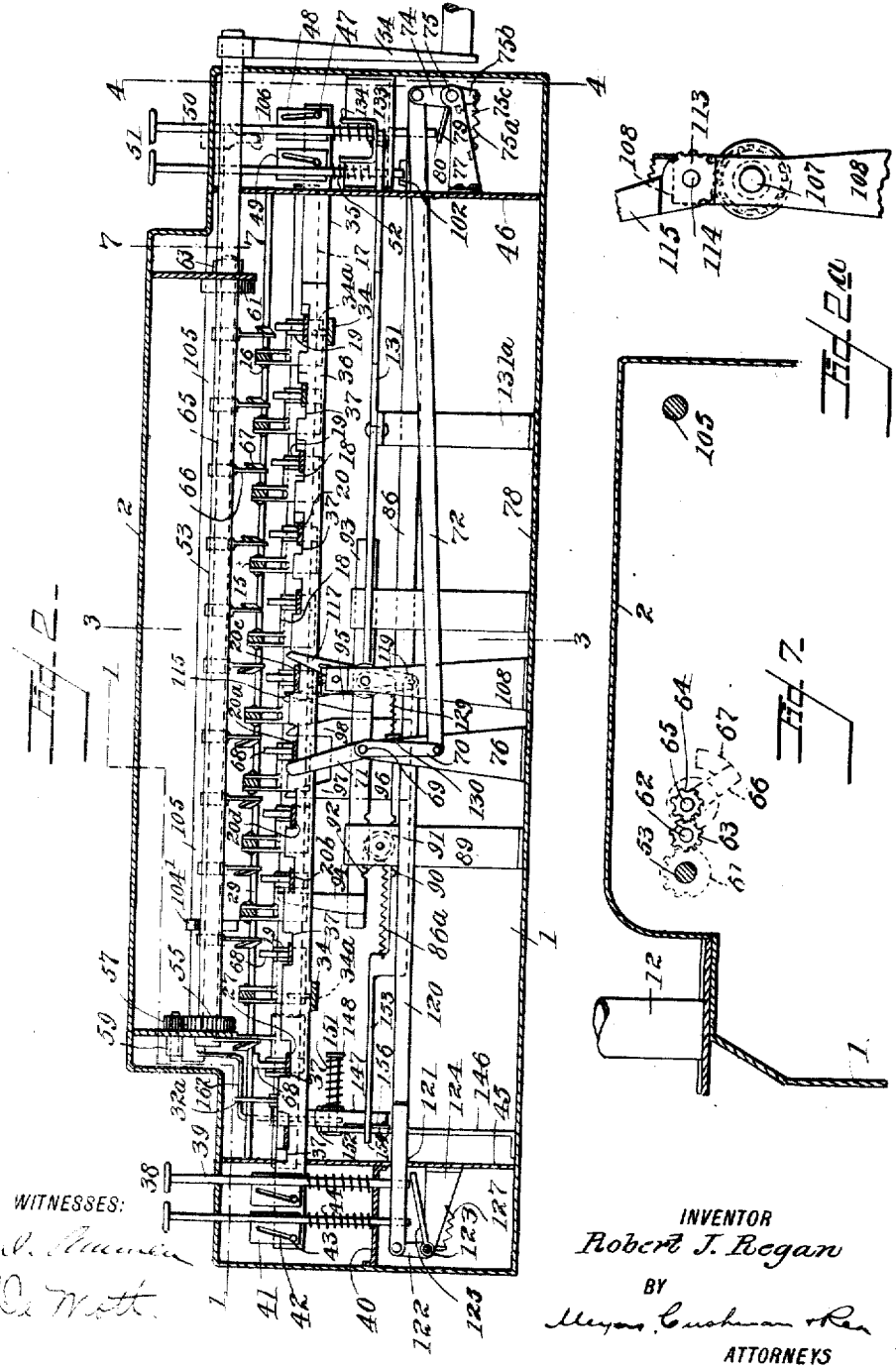

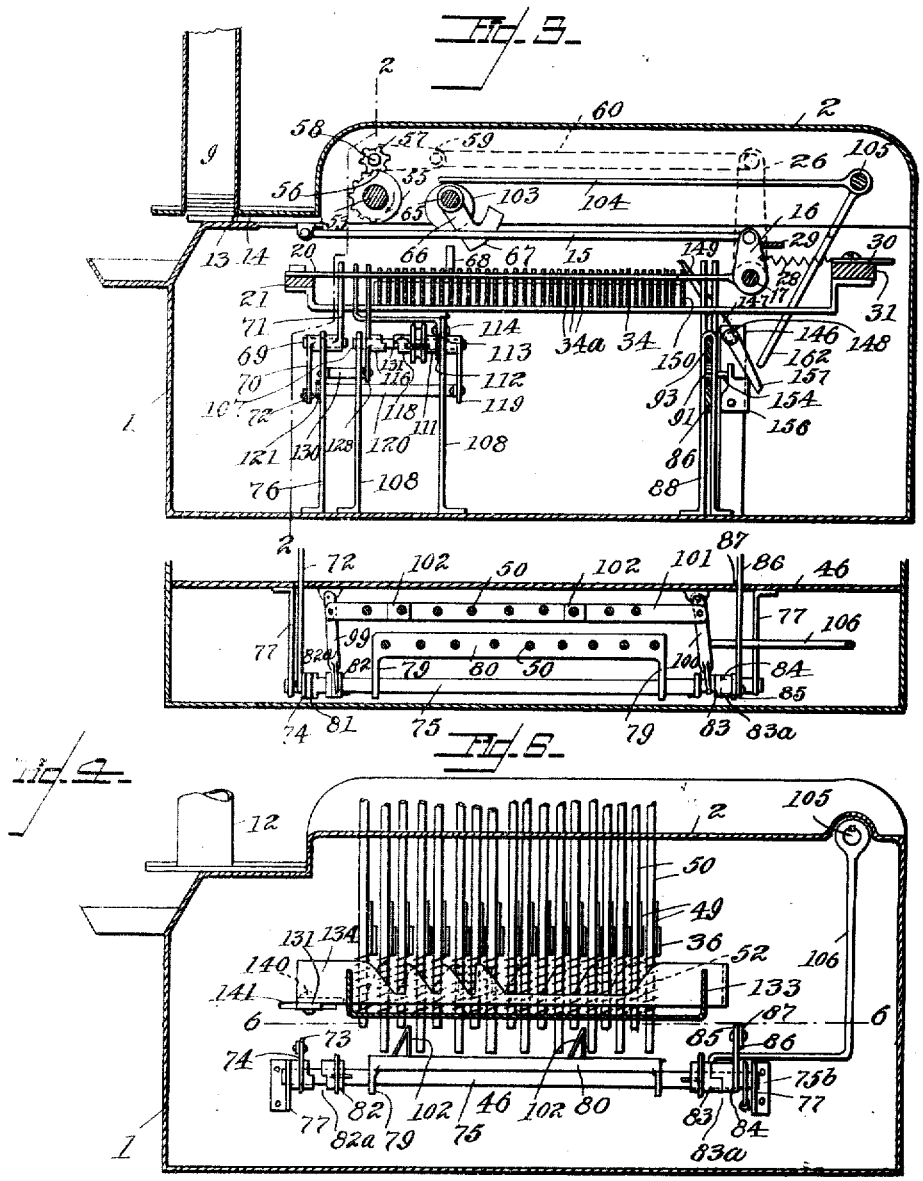

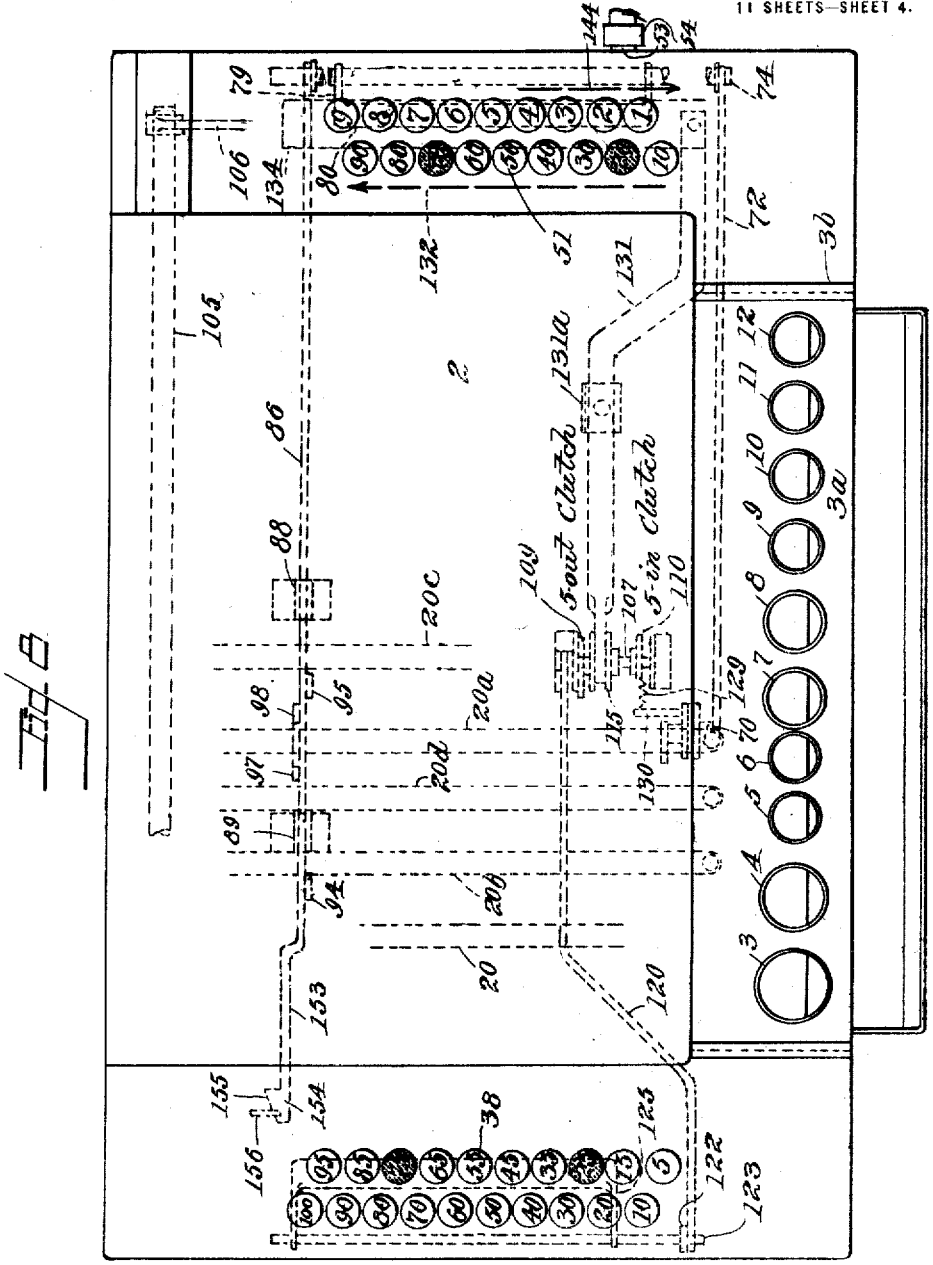

Fig. 9

R. J. REGAN.
CHANGE MAKING MACHINE.
APPLICATION FILED MAY 26, 1915.

1,293,548.

Patented Feb. 4, 1919.
11 SHEETS—SHEET 6.

WITNESSES:

INVENTOR
Robert J. Regan
BY
ATTORNEYS

R. J. REGAN.
CHANGE MAKING MACHINE.
APPLICATION FILED MAY 26, 1915.

1,293,548.

Patented Feb. 4, 1919.
11 SHEETS—SHEET 7.

Fig. 13. — 85 cts.

| 85¢ Key | Clutch | \<td colspan=8\>Coins - cts.\</td\> | | | | | | | | Cost Keys | |
|---|---|---|---|---|---|---|---|---|---|---|---|---|
| | | 50 | 25 | 10 | 10 | 5 | 5 | 1 | 1 | 1 | 1 | Dime Key | Cent Key |
| Normal | Open | ○ | ○ | ○ | ○ | ○ | | | | | | | |
| | | | ○ | | | ○ | | | | | | 70 | |
| | | | | ◉ | ◉ | | ○ | ○ | ○ | ○ | ○ | | 6 |
| 85 | cl. | | | | | ◉ | ○ | ○ | ○ | ○ | ○ | | |
| | | | | ○ | ○ | | | | | | | 80 | |
| 85 | cl. | | | | | ◉ | | | | | | | |
| | | | | | | | | | | | | | |
| | | | | ○ | ○ | | | | | | | 80 | |
| | | | | | ○ | | | ○ | ○ | ○ | ○ | | 1 |
| 85 | cl. | | | | | | ○ | ○ | ○ | ○ | ○ | | |
| 85 | cl. | | | | | | | | | | ○ | 80 | 4 |

Fig. 14. — 80 cts.

| | ○ | | ○ | | | | | | 70 | |
|---|---|---|---|---|---|---|---|---|---|---|
| | | ◉ | ◉ | | ○ | ○ | ○ | ○ | | 1 |
| 80 cl | | | | | ○ | ○ | ○ | ○ | | |
| | | | | | | | | | | |
| | ○ | | ○ | | | | | | 70 | |
| | | ◉ | ◉ | | ○ | ○ | ○ | ○ | | 6 |
| 80 cl | | | | | ○ | ○ | ○ | ○ | | |
| 80 cl | | | | | | | | ○ | 70 | 9 |

Fig. 15. — 75 cts.

| | ○ | ○ | ○ | ○ | | | | | 50 | |
|---|---|---|---|---|---|---|---|---|---|---|
| | ○ | ○ | | ○ | ○ | ○ | ○ | ○ | | 1 |
| 75 cl | ○ | | ○ | ○ | ○ | ○ | | | | |
| | | | | | | | | | | |
| | ○ | ○ | ○ | ○ | | | | | 50 | |
| | ○ | ○ | | ○ | | ○ | ○ | ○ | | 6 |
| 75 cl | ○ | | ○ | ○ | | ○ | | | | |
| | | | | | | | | | | |
| | ○ | | ○ | | | | | | 60 | |
| | ○ | | | ○ | ○ | ○ | ○ | ○ | | 1 |
| 75 cl | | | ○ | ○ | ○ | ○ | | | | |
| | | ○ | | ○ | | | | | 70 | |
| | | ◉ | ◉ | | ○ | ○ | ○ | ○ | | 1 |
| 75 cl | | | | | | ○ | ○ | ○ | ○ | |

WITNESSES

INVENTOR
Robert J. Regan
BY
ATTORNEYS

R. J. REGAN.
CHANGE MAKING MACHINE.
APPLICATION FILED MAY 26, 1915.

1,293,548.

Patented Feb. 4, 1919.
11 SHEETS—SHEET 6.

WITNESSES:

INVENTOR
Robert J. Regan
BY
Meyers Cushman & Rea
ATTORNEYS

Fig. 20.

R. J. REGAN.
CHANGE MAKING MACHINE.
APPLICATION FILED MAY 26, 1915.

1,293,548.  Patented Feb. 4, 1919.
11 SHEETS—SHEET 10.

INVENTOR
Robert J. Regan

R. J. REGAN.
CHANGE MAKING MACHINE.
APPLICATION FILED MAY 26, 1915.

1,293,548.

Patented Feb. 4, 1919.
11 SHEETS—SHEET 11.

WITNESSES:

INVENTOR
Robert J. Regan
BY
Meyers, Cushman & Rea
ATTORNEYS

UNITED STATES PATENT OFFICE.

ROBERT J. REGAN, OF BAYONNE, NEW JERSEY.

CHANGE-MAKING MACHINE.

1,293,548. Specification of Letters Patent. Patented Feb. 4, 1919.

Refiling of application Serial No. 665,371, filed December 12, 1911. This application filed May 26, 1915. Serial No. 30,660.

*To all whom it may concern:*

Be it known that I, ROBERT J. REGAN, a citizen of the United States, residing at Bayonne, in the county of Hudson and State of New Jersey, have invented new and useful Improvements in Change-Making Machines, of which the following is a specification.

This invention relates to a machine, the purpose of which is to make change for purchasers. The object of the invention is to produce a machine of this class which is simple in construction and which will operate quickly and reliably to perform the operation of making change between the price of an article sold and the amount of money which is paid for it.

The general purpose of the invention is to relieve the mind of the cashier from the necessity of performing the mental operation of making change, and thus increase the rapidity of making change without causing mistakes.

In carrying out the invention, cost keys are provided which may be depressed by the operator according to the price of the article sold, and pay keys corresponding to the amount paid in are likewise depressed. The depression of these keys sets the mechanism of the machine in operation, so that the machine automatically makes the change.

In the preferred form of the invention which is illustrated the coins from which the change is made are held in magazines which are divided into two sets or divisions. If one coin is taken from each of the magazines of the first division they will aggregate one dollar, or other monetary unit. The ejection of coins from the magazines of the first division is controlled by both the sets of keys. The coins in the magazines of the second division are principally for assisting in producing the proper amount of change and the aggregate of coins in these magazines is 9¢. In general the ejecting mechanism of the magazines is controlled by a plurality of parallel bars, or other means, the movements of which are controlled directly by the keys, but in certain special operations of forming change, certain of the ejecting mechanism for the magazines are controlled by interposed clutches or special devices operating independently of the said parallel bars and arranged to be controlled by certain keys. The machine illustrated has capacity for making change for a purchase of an article valued from one cent up to one dollar.

The invention consists in the construction and combination of parts to be more fully described hereafter and particularly set forth in the claims.

In the drawing which fully illustrates the preferred form of my invention,

Figure 1 is a plan of the change making machine, certain parts being broken away, and shown in section.

Fig. 2 is a longitudinal section through the machine taken about on the line 2—2 of Fig. 3.

Fig. 2ª is a detail elevation of part of the mechanism of Fig. 2 upon an enlarged scale.

Fig. 3 is a cross section of the machine, taken about on the line 3—3 of Fig. 2.

Fig. 4 is a vertical section taken through the machine about on the line 4—4 of Fig. 2, and particularly illustrating the mechanism controlled by the cost keys which are depressed according to the cost of the article purchased.

Fig. 5 is a side elevation of a shifting bar which is shown in Fig. 4 and which is controlled by the cost keys to throw special clutches in or out.

Fig. 6 is a horizontal section taken about on the line 6—6 of Fig. 4, and illustrating shifting means for other special clutches.

Fig. 7 is a vertical section taken about on the line 7—7 of Fig. 2 and particularly illustrating means for replacing the parts in their normal position after a change making operation.

Fig. 8 is a plan for the machine, particularly illustrating the 5¢ clutch and the means for controlling it. This view also further illustrates the mechanism which comes into operation when the coins received in payment aggregate 25¢ or 75¢.

Figs. 9–29 are charts illustrating the mode of operation of the machine in making change.

Before proceeding to a detailed description of the mechanism it may facilitate the disclosure to outline the main features of construction in the machine.

As suggested above the coins are held in magazines arranged in two divisions; the denominations of the coins in the first division aggregate one dollar, while those in the second division aggregate 9¢. These magazines have individual ejecting devices which when operated will eject one coin from the magazine, and these ejecting devices are controlled by individual clutches corresponding to each magazine. The condition of these clutches, that is, whether they are actively or inactively related is controlled by the cost keys and by the payment keys or pay keys. These clutches are arranged in a gang on the same shaft and the operation of this shaft is itself controlled by a main clutch which must be closed before the shaft can be rotated to eject the coins required. The gang clutches which control the ejecting devices of the first division are normally closed and when any cost key is depressed it throws open the gang clutches of the first division corresponding to its number. For instance, when the 30¢ cost key is depressed it opens the 25¢ clutch and 5¢ clutch of the first division inhibiting their ejecting mechanisms, so that it leaves the ejecting mechanism of the first division operating or set to eject a 50¢ and two 10¢ pieces; which gives the correct change. The cost keys are arranged in two sets, dime keys and cent keys. The depression of one of the cent keys normally throws out or opens one of the 10¢ gang clutches of the first division and may also at the same time throw in the 5¢ or any of the four 1¢ magazines of the second division.

Under certain conditions, however, a special mode of operation is necessary which supersedes the normal operation of the machine; for instance, where the 70¢ cost key has been depressed it leaves the 25¢ ejecting mechanism and the 5¢ ejecting mechanism of the first division intact so that 30¢ will be ejected. However, if one of the cent keys is depressed following the depression of the 70¢ key, the normal operation usually effected by this cent key cannot take place for there is no 10¢ gang clutch then closed, for the cent key to throw open. Under these circumstances a special operation takes place which consists in automatically throwing in again the two 10¢ clutches. This operation itself is equivalent to throwing out a 10¢ clutch and therefore produces the correct change.
In other cases in making change, occasion often necessitates the throwing in or throwing out of a 5¢ piece and therefore the 5¢ ejecting mechanism of the first division is controlled to a certain extent by a special clutch.

Another special operation is effected by the depression of a 25¢ or 75¢ pay key following the depression of a 20¢ or 70¢ cost key.
Referring more particularly to the parts of the machine, 1 represents the case on the cover 2 of which at a suitable point there is arranged a plurality of magazines, 3, 4, 5, 6, 7, 8, 9, 10, 11 and 12. These magazines are for coins of different denomination and the magazines 3—7 constitute the first division and respectively receive coins of the denomination of 50¢, 25¢, 10¢, 10¢ and 5¢. I provide means normally set for ejecting a coin from all of these magazines simultaneously. The magazines 8—11 constitute the second division; the magazine 8 is for 5¢ pieces, and the other four magazines 9—12 contain pennies. These magazines are of simple tubular form, as indicated. An individual ejecting device is provided corresponding to each magazine. As shown in Fig. 3, the coin rests on a shelf 13 and behind the bottom coin of each magazine a transversely guided ejecting slide 14 is provided, and these ejecting slides are adapted to be actuated by horizontal push rods 15 which extend toward the rear wall of the machine and are attached respectively to vertically extending arms 16 carried loosely on a longitudinally extending rock shaft 17 which extends substantially throughout the entire length of the machine as indicated. These arms 16 have hubs 18 which constitute clutch members cooperating with collars 19, which are non-rotatable on the shaft 17; and these collars are all arranged so that they may be slid on the shaft by means of horizontal ejector arms indicated collectively by the numeral 20, which extend from front to rear of the machine, all of the said arms being pivotally supported at their forward ends on a horizontal frame-bar 21. As the collars 19 are non-rotatable on the rock shaft 17, when they are in engagement with the hubs 18 of the arms they form clutches 22 so that when the rock shaft is rocked the push rods 15 will be actuated by the arms. In this way the ejecting slides 14 are actuated and it will be seen that only those ejecting slides will be actuated whose clutches 22 are closed. These clutches 22 are arranged in a gang as indicated in Figs. 1 and 2 along the rock shaft.

At the left end of the machine, as shown in Fig. 1, the main clutch 23 is provided, comprising a sliding collar 24, and the hub 25, said hub being formed on an arm 26 for actuating the rock shaft. The clutch member or collar 24 is non-rotatable on the shaft but the hub 25 is loose. The collar 24 is adapted to be slipped in and out of engagement with the clutch member 25 by an arm 27, said arm being similar to the arm 20, and pivotally attached in the same manner to the aforesaid frame bar 21.

The ejecting slides 14 are normally all held in a withdrawn position by means of individual springs 28 which are attached to the arms 16 and hold the said arms against a stop bar 29 which extends longitudinally in the machine. These springs are attached to slotted adjustable plates 30 mounted on a longitudinally extending frame bar 31 near the rear wall of the machine. A similar spring 32 is attached to a rigid arm 32ª on the rock shaft which returns the rock shaft after it is actuated. The spring 32 is also connected to an adjusting plate 33 similar to the plates 30 and mounted on the frame bar 31.

The frame bars 21 and 31 are connected by two cradle bars 34 which extend horizontally from front to rear within the machine to support a plurality of horizontal shifting bars 35, which terminate at the left end of the machine, and a similar set of shifting bars 36 which terminate at the right end of the machine. The bars 35 generally alternate with the bars 36 and are separated from them by upright pins 34ª on the bars 34. All these bars 35 and 36 have enlarged notches 37 in which the arms 20 and the arm 27 lie respectively, so that when the bars are shifted longitudinally they will shift certain of the arms 20, or the arm 27, to throw the gang clutches 22 open or closed; and also to control the main clutch 23.

At the left end of the machine I provide a plurality or set of pay keys 38 which are arranged in two rows as indicated in Fig. 8. The left row bears the numbers 10, 20, 30 etc. up to 100; the right hand row bears the numbers 5, 15, 25, etc., to 95. These keys may be depressed to correspond with the amount paid to the cashier. Thus, if 60¢ is handed to the cashier, the 60 key should be depressed. These keys 38 all have stems 39 which extend down through the cover 2 of the machine, and project through a horizontal guide plate 40 in the interior. Each stem 39 is provided with a cam-plate 41 having an inclined or cam slot 42 formed therein, and these slots 42 engage with pins 43 carried by the notch-bars or shifting bars 35. The keys are normally held up and returned by spiral springs 44 disposed around the stems as indicated most clearly in Fig. 2. By depressing one of these keys it will be evident that the pin and slot connection will cause the corresponding notch bar or shifting bar 35 to be shifted longitudinally. In order to guide the bars 35 and 36 their ends pass through partition walls 45 and 46 placed in the machine near the ends thereof. By reason of the great width of the notches, the unmoved bars will not prevent this shifting of the pivoted arms.

A similar arrangement is provided at the right end of the machine for controlling the ejecting devices by actuating the shifting bars 36, that is, these bars, beyond the partition wall 46, have pins 47 which connect them with inclined slots 48 formed in cam-plates 49 carried by the stems 50 of a set of cost keys 51. These cost keys are arranged in two rows, the left row numbered 10, 20, 30, etc., to 90. This left row may be designated as the "dime" row, that is, it contains all the dime keys bearing numbers which are even multiples of one dime. The right hand row has its keys numbered consecutively from 1 to 9 and may be designated as the "cent" row. From this construction it will be evident that if any of the cost keys are depressed they will cause a shifting of their corresponding shifting bars 36 to enable any of the clutches 22 to be opened or closed. These keys 51 are normally held up and returned by coil springs 52 around their stems, as shown in Fig. 2. When a certain change making operation has been partly performed by depressing the proper keys the clutches 22 will all be properly set by shifting the clutch members 19 by means of the arms 20; the depression of any pay key operates through its corresponding shifting bar 35 also to move the arm 27 and close the clutch 23 so that if the rock shaft is then rocked the proper ejecting slides 14 will be actuated. It also opens certain of the clutches 22. After the keys have been depressed, they are returned immediately by their springs. It is necessary, however, that the cost keys be depressed before the pay keys, in any change-making operation. It is immaterial whether the cost keys are completely returned to normal position before the pay keys are depressed.

In order to actuate the rock shaft 17 as suggested, I provide a driving shaft 53 which is mounted horizontally in the upper part of the machine and provided with a crank 54 for rotating it. This shaft 53 is provided near the left end of the machine with a segmental gear wheel 55 as shown in Fig. 3. Half of the face of this gear is plain and stripped of teeth, and normally rests in a concave notch 56 formed in the face of a pinion 57, but when the segmental gear 55 is rotated, its teeth engage with the teeth of the pinion 57 and give it one complete rotation. The pinion 57 is rigid on a stub shaft 58, carrying a rigid arm 59 and this arm 59 is connected by a link 60 with the aforesaid arm 26. From this arrangement it will be seen that when the driving shaft is rotated, the rock shaft 17 will be rocked forward and back again and then remain stationary. The spring 32 attached to arm 32ª returns the rock shaft to its normal position.

The rotation of the driving shaft also returns all of the shifting arms 20 to their normal position. In order to accomplish this, near the right end of the machine the driving shaft 53 is provided with a segmental gear 61 (Fig. 1) which is somewhat similar to the segmental gear 55, and it meshes with a pinion 62ª similar to the pinion 57 and mounted on a stub shaft 62 carrying a rigid pinion 63; this pinion 63 meshes with a pinion 64, which is rigidly mounted on a retrieving shaft 65 which extends horizontally through the upper part of the machine parallel with the driving shaft. This shaft 65 carries a plurality of radial arms 66 which have inclined cam plates 67. With every rotation of the driving shaft this shaft 65 makes a complete rotation and as the cam plates 67 pass under the shaft 65 they engage posts 68 which project up from the upper sides of the arms 20, 20, etc., and 27 and shift the said arms back into their normal position. It should be understood that the shifting bars 35 and 36 control the clutches 22; but in some cases it is necessary to give the machine a special mode of operation involving the use of other clutches. The depression of any cent key of the cost keys, except when following the 20 or 70 dime key, will operate through the shifting bars to throw out a 10 clutch and throw in the correct gang clutches for the magazines of the second division. For instance, depressing the 1¢ cost key through the operation of its notch bar 36 prevents the ejection of a certain coin by throwing open the gang clutch 22 corresponding to the right hand 10¢ magazine of the first division. At the same time its notch bar 36 selects coins to be substituted by throwing in the gang clutch of the 5¢ magazine and all the gang clutches of the cent magazines of the second division. The depression of the 2¢ key will have a similar effect except that it will only operate upon three of the penny magazine clutches.

Where a 20¢ or 70¢ cost key is depressed the shifting bars 36 of either of these keys opens the gang clutches of the two dime magazines of the first division, and hence an arrangement must be made such that a cent key depressed subsequently to either of these dime keys will give a special or abnormal operation. This abnormal operation consists in throwing open the 25¢ and 5¢ clutch of the first division and closing or substituting the two 10¢ clutches. This operation is equivalent to eliminating a 10, so that when the shifting bar operates to close the usual clutches of the second division the correct amount of change will be produced. The normal change making mechanism will now be described, that is, the mechanism which is normally actuated by the depression of a cent key so as to throw open a dime clutch of the first division and throw in the proper number of cents in the second division. As indicated, most clearly in Figs. 2 and 3, near the forward side of the machine there is provided a rock shaft 69, which is actuated by a lever 70, and this rock shaft has an upwardly extending dog 71 which lies adjacent to the left hand edge of the shifting arm 20ᵃ which controls the right hand dime clutch of the first division. The lever 70 is actuated by a link 72 which extends over to the right and through a slot 73 in the partition wall 46, beyond which point the lever is attached pivotally to an upwardly extending arm 74 mounted on a rock shaft 75. The rock shaft 69 and the rock shaft 75 are suitably mounted in brackets 76 and 77 the former being mounted on the floor 78 of the machine, and the latter being mounted on the side of the partition wall 46. The rock shaft 75 is provided with arms 79 connected by a bar 80, and this bar 80 lies under the stems 50 of the cent keys. With this arrangement whenever one of these cent keys is depressed the link 72 is actuated so as to rock the dog 71 toward the right, and throw open the dime clutch having the shifting arm 20ᵃ. As stated above the shifting bars 36 of the different cent keys have their notches 37 arranged so as to shift the shifting arms 20 of the second division in such a way that the 1¢ key will throw in 9¢, the two cent key will throw in 8¢, the 3¢ key will throw in 7¢ and so on. The 5¢ key will not throw in any of the penny clutches but will throw in the 5¢ clutch only. The 9¢ key will simply throw in one of the 1¢ clutches. From this arrangement it will be evident that the depression of any of the cent keys will throw out a dime clutch of the first division and throw in the proper amount of change from the dime, that is, the cent keys under normal conditions subtract from a dime and arrange the clutches to throw out the proper change from the second division of magazines. While this is the normal mode of operation it depends upon the position of certain clutches which will now be described, referring particularly to Fig. 6. The aforesaid arm 74 is loose on the rock shaft 75 and has a hub 81 which is formed into a clutch member coöperating with a corresponding clutch member or sliding collar 82 mounted on the rock shaft. These clutch members 81 and 82 are normally closed together, and the clutch member 82 is non-rotatable on the rock shaft so that the motion of the shaft will normally be imparted to the link 72.

The abnormal operation of the machine will now be described, that is, the case when the 20¢ or 70¢ dime key is depressed previous to depressing one of the cent keys. The rock shaft 75 extends transversely of the machine at the right end as indicated, and near its rear end is provided with a sliding clutch collar 83 which is also nonrotatable on the rock shaft, and this clutch collar coöperates with the hub 84 forming a clutch member and which is rigid upon an upwardly extending arm 85. This arm 85 has a link 86 attached thereto which extends through a suitable slot 87 in the partition wall 46 and passes longitudinally through the machine near the rear thereof. Through the medium of this link 86 the 25¢ and 5¢ clutches may be opened and the two dime clutches closed or substituted, simply by the depression of any cent key subsequent to a 70¢ or 20¢ key. In order to accomplish this the link 86 passes through two suitable bifurcated guide posts 88 and 89 as shown in Fig. 2, and near the guide post 89 it is formed on its upper edge into a rack 90 the teeth of which mesh with a pinion 91 mounted in the guide post 89, and the upper edge of this pinion engages the teeth 92 of a rack bar 93 which is also mounted to slide longitudinally and guided in the posts 88 and 89. This rack bar 93 has two upwardly extending dogs 94 and 95 the right vertical edges of which lie substantially against the left edges of the shifting arms 20$^b$ and 20$^c$ of the shifting arms 20 which control the 25¢ clutch and the 5¢ clutch of the first division; and the link 86 is also provided with an upwardly extending plate 96 which has two upwardly extending dogs 97 and 98 which lie near the right hand edges of the two arms 20$^d$ and 20$^a$ which control the two dime clutches of the first division. Now when the link 86 is thrust (against the action of its return spring 86$^a$) toward the left by the rocking motion of the arm 85 the two dogs 97 and 98 will shift the two dime clutch arms 20$^d$ and 20$^a$ toward the left, and shift the 25¢ arm 20$^b$ and the 5¢ arm 20$^c$ toward the right. In this connection it should be remembered that before this operation takes place the two dime clutches will have been opened by the movement of the 70¢ key or the 20¢ key.

In order to shift the clutch collars 82 and 83 automatically so that under normal conditions the dime clutch 82$^a$ will be closed and the substituting clutch 83$^a$ opened, the following mechanism is provided. The collars 82 and 83 are shifted by shifting arms 99 and 100, which are pivotally mounted on wall 46 and connected near their pivot points by shifting link 101. This shifting link extends under the stems 50 of the dime keys; directly under the stems of the 20¢ key and the 70¢ key there are provided cams 102 in the form of spurs having inclined faces which are engaged by the stems of these keys when they are depressed. From this arrangement it will be seen that when either the 20¢ or 70¢ key is depressed the link 101 will be shifted toward the right as viewed in Figs. 4 and 6. This opens the clutch 82$^a$ and closes the clutch 83$^a$. From this arrangement it follows that the depression of a cent key following the 20¢ or 70¢ dime key will not operate as normally to open a dime clutch of the first division, but will simply open the clutches of the 25¢ and 5¢ magazines and substitute the two dime magazines by closing their clutches. The rock shaft 75 is returned by spring 75$^a$ which pulls a stop arm 75$^b$ against a stop pin 75$^c$ (Fig. 2).

In order to replace the clutches 82$^a$ and 83$^a$ in their normal condition the shaft 65 is provided with an eccentric 103 upon which rests the end of an arm 104 which extends rearwardly and is attached to a rock shaft 105 extending longitudinally in the rear and upper part of the machine. This rock shaft 105 is provided at its right end with a downwardly extending arm 106 as indicated in Figs. 1 and 6, and this arm lies against the arm 100 when the clutch 82$^a$ is open. Now when the shaft 65 is rotated at the moment when the ejecting slides 14 are being actuated, the rotation of the eccentric 103 moves the arm 104 up and rocks the shaft 105 so that the arm 106 pushes or "kicks" the arm 100 over, and returns the clutches to their normal position. In other words the shaft 65 not only operates through the arm 66 to replace the shifting arms 20 in their normal position, but also operates to replace the clutches 82$^a$ and 83$^a$ in their normal position; that is, it constitutes a replacing or retrieving mechanism.

Whenever change has to be made from an amount which is a multiple of a dime, that is, for instance from 10¢, 20¢, 30¢, etc., up to $1, the operation of the machine as regards the pay keys is normal, that is, the depression of each of the dime keys simply throws open the proper clutches of the first division, but in connection with the operation of these keys it should be understood that they are complementary in their action, that is, the depression of the 30¢ pay key at the left of the machine opens the clutches of magazines, the denominations of which aggregate 70¢; that is, it would leave 30¢ to come from the first division of magazines except for the reduction which has already been made by the depression of the cost keys; and it should be understood that these dime keys of the pay keys simply operate through their corresponding shifting bars and their notches to shift the proper clutch arms 20 to their open position. When change must be made from an amount terminating in 5, for instance, a payment of 5¢, 15¢, 35¢ etc. up to 95¢, special controlling mechanism is brought into play, but at the outset it should be understood that this mechanism now to be described is not operated by the 25¢ pay key, nor by the 75¢ pay key. Directly under the arm 20$^c$ aforesaid which controls the 5¢ clutch of the first division there is provided a horizontal clutch shaft 107 as shown in Figs. 3 and 8, said clutch shaft being suitably supported in bracket posts 108. On this clutch shaft there are provided two clutches, viz., a clutch 109 which is indicated in Fig. 8 as the "5-out clutch", and a clutch 110 which is designated in Fig. 8 as the "5-in clutch". The 5-out clutch comprises a clutch member 111 which is formed on the hub of a gear wheel 112, which meshes with a segment 113 mounted on the pivot pin 114, and formed with an arm or dog 115 which extends upwardly so that its end lies near the left edge of the shifting arm 20¢, as indicated in Figs. 2 and 3. At the other end of the clutch shaft 107, the 5-in clutch comprises a clutch member 116 which forms the hub of an upwardly extending dog 117 and this dog lies near the right hand edge of the shifting arm 20¢. Between the clutch members 115 and 116, slides a double clutch collar 118 which is non-rotatable on shaft 107; and when this clutch collar engages the clutch member 111, the dog 115 will be rocked toward the right if the rock shaft 107 is rocked toward the left. This reversed movement is imparted to the dog 115 by reason of the gears 112 and 113. When the collar 118 is in engagement with the clutch member 116 the motion of the clutch shaft 107 will be imparted directly to the dog 117 and will rock this finger toward the left and throw the 5¢ gang clutch in. The clutch shaft 107 is actuated by an arm 119 which is rigid with it and extends downwardly so as to be attached to an offset link 120 which extends to the left of the machine and passes through a slot 121 in the partition wall 45 as indicated in Fig. 2. Near this point this link is attached pivotally to a rocker arm 122 which extends upwardly from a rock shaft 123 mounted in brackets 124 attached to the wall 45. This rock shaft is provided with rigid arms 125 connected by a bar 126 which lies under the stems 39 of the right hand row of pay keys, that is, it lies under all of the pay keys of a denomination terminating in 5, excepting the 5¢ and 15¢ keys. A spring 127 attached under the arm 122 returns the said arm 122 to its normal position and returns the depressible bar 126 when it has been depressed by the stems of the keys.

In order to return the finger 117 after it has been actuated the hub 116 is provided with a downwardly extending arm 128 to which a spring 129 is attached as indicated in Fig. 8 and one end of this spring is attached to a fixed bracket or post 130 extending out horizontally from the aforesaid bracket 76.

In order to shift the clutch collar 118 so as to close the 5-in clutch, or the 5-out clutch, there is provided a clutch shifting lever 131 indicated in dotted lines in Fig. 8, pivoted on a post 131ª. It should be understood that these clutches, namely the 5-in clutch and the 5-out clutch are controlled from the cost keys but the mechanism which is operated through these clutches when closed is actuated by the pay keys. As indicated by the arrow 132 in Fig. 8 all of the dime keys of the cost keys when operated, throw in the 5-in clutch. If the number of the cent key following the depression of one of the dime keys of the cost keys is greater than 4, the 5-in clutch remains in, that is, it remains in the position in which it is set automatically by the dime key which has just been depressed; if on the contrary the cent key which follows is less than 5, the 5-in clutch is opened automatically and the 5-out clutch is closed. In this way sometimes the cent key may undo the work performed by the dime key. This mode of operation is necessary because when the number of the cent key following is as great as 5 the 5 will not be wanted and must be thrown out.

The mechanism for controlling this 5¢ clutch lever 131 will now be described referring particularly to Figs. 2, 4, 5 and 8. Between the partition wall 46 and the end wall of the machine a guide bracket 133 is provided in which there is mounted to slide horizontally, a bifurcated shifting arm 134, which consists of two vertically disposed bars 135 and 136 connected at their rear end by an integral cross bar 137. The bar 135 is provided with a plurality of notches 138 presenting inclined edges 139 which are adapted to be struck by the lower edges of the plates or blades 49 which are attached to the stems 50 of the dime cost keys, so that when these keys are depressed they will shift the bar toward the rear of the machine. The end of this bar 134 is pivotally attached at a cross web 140 to the aforesaid 5¢ clutch lever 131, which passes through a slot 141 in wall 46 as indicated in Fig. 4, for this purpose. In this connection it should be understood that the order in which the cost keys is depressed is important and the dime key should always be depressed first. The bar 136 is provided with notches 142 which are similar to the notches 138 but are in a reversed position so that they present inclined edges 143 which may be struck by the lower edges of the plates or blades 49 of the cent keys 1¢ to 4¢, which will have the effect of throwing the lever 141 back, and throwing the 5-out clutch into operation instead of the 5-in clutch. These notches 142 occur however only under the cent keys of denominations of 1¢ to 4¢ as indicated by the arrow 144 in Fig. 8, and as shown in Fig. 5. From this arrangement it will be seen that any of the dime keys of the cost keys upon being depressed will throw the 5-in clutch into active condition and if the cent key depressed thereafter exceeds 4 in denomination the 5-in clutch will remain closed. If, however, the cent key depressed subsequently is less than 5¢ in denomination the 5-in clutch will be thrown open and the 5-out clutch closed.

As indicated in Fig. 8 the bar 126 does not extend under all of the keys in the right hand row of the pay keys but only extends from the 25¢ key to the 95¢ key. Furthermore the 25¢ key and the 75¢ key will not operate the bar 126 to actuate the link 120.

and in order to accomplish this the bar 126 under the 25¢ key and the 75¢ key is provided with openings 145 as indicated in Fig. 1, which permit the stems of the keys to pass through without moving the bar.

A special or abnormal operation takes place when the 25¢ pay key or the 75¢ pay key is depressed. These two keys under some circumstances are independent in their action and in other circumstances are not so. In addition to their normal independent effect on the mechanism, they may have a second effect. This second effect arises if they are depressed following the depression of the 20¢ or 70¢ key respectively of the cost keys; for instance, where change is being made from a 75¢ payment for an article costing from 70 to 74¢, and likewise where change is being made from a 25¢ payment for an article costing 20¢ or more.

This mechanism which is now to be described is therefore controlled by the 20¢ and 70¢ cost keys, and by the 25¢ and 75¢ pay keys.

Referring especially to Figs. 1, 2, 3 and 8, near the rear and left end of the machine a bracket post 146 is provided upon which there is mounted a "floating" pawl 147 on a pivot pin 148 so as to rock in a vertical plane in a front and rear direction, and the upper end of this pawl is adapted to engage in a notch 149 in the upper edge of a special shifting bar 150 which is parallel with the other notch bars 35 and 36, and arranged farther to the rear. A return spring 150ª returns this bar after shifting. On the pin 148 there is provided a coil spring 151 which presses this pawl 147 frictionally against the bracket post and holds it frictionally in any position in which it happens to be left. For this purpose the spring 151 presses against a washer 152 on the side of pawl 147. This pawl is normally held out of engagement with the notch 149 of the bar 150, but it will be moved down into the notch when any cent key is depressed following the 70¢ key or the 20¢ key. In order to accomplish this, the aforesaid link 86 is provided with an extension or offset stem 153, and the end of this stem is formed into a cam 154 as indicated in Fig. 8, presenting an inclined edge 155; when the stem 153 advances toward the left this cam edge 155 engages a rocking plate 156 pivotally mounted on the side of the post 146, and this rocking plate pushes the tail 157 of the pawl 147 and rocks the pawl in a left hand direction as will appear from an inspection of Fig. 3. When the pawl is down in the notch of the bar 150 it enables the bar 150 to be actuated by either of the shifting bars 35ª or 35ᵇ of the 25¢ and 75¢ pay keys. The bar 150 is provided with a return-spring 150ˢ as indicated in Fig. 8. In order to enable these bars 35ª and 35ᵇ to actuate the common bar 150 there is provided a special shifting arm (Fig. 1) which is pivoted on the aforesaid frame bar 21 and arranged with its free end lying adjacent to the left edge of the dog 147. The bars 35ª and 35ᵇ are provided with notches 159ª and 159ᵇ in which the bar 158 lies, and the arm 158 adjacent to these notches is provided with lugs 160 which are engaged by the ends of the notches so as to enable the arm to be shifted toward the right when either of the keys referred to is depressed.

The bar 150 is provided with notches 161 adjacent to all of the arms 20 of the first division so that the bar 150 will open all of the gang clutches of the first division and the 5¢ clutch of the second division so that the change will come entirely from the penny magazines. In this connection it should be understood that the pawl 147 is loose on its pin so that it also shifts and permits the lateral shifting of the arm 158, and as soon as the pressure upon the arm 158 is released the spring 151 of the pawl pushes the pawl back flatly against the side of the post 146 and holds it there frictionally.

Mechanism is provided for returning the pawl 147 to its normal position, that is, for moving it out of engagement with the notch 149. For this purpose the aforesaid shaft 105 is provided at its left end with an offset arm 162 the end of which extends down and lies near the tail 157 of the dog as shown in Fig. 3. Now when the shaft 105 is rocked its replacing arm or lever 162 rocks toward the left and pushes the tail 157 of the pawl 147 down so as to disengage the pawl from the notch, as will be readily understood, and when the replacing arm 162 withdraws, the spring 151 will hold the pawl frictionally and yieldingly in this position. The $1 pay key does not open or close any magazine clutches but simply operates a short notch bar 35ᵈ to close the main clutch as illustrated in Fig. 1.

In order to enable all the magazines 3 to 12 to be completely discharged simultaneously they are all mounted on a sliding plate 3ª the edges of which are guided at 3ᵇ. By pulling this plate forward the contents of the magazine tubes can be dumped into a sack or other receptacle.

The mode of operation of the entire machine will now be described, referring particularly to the charts or tables shown in Figs. 9 to 29 inclusive. In explanation of these charts it should be stated that they present a plurality of columns corresponding to the magazines of the first and second divisions, and in each horizontal row is represented the coins which will come from the machine upon the depression of certain keys, the cost keys being indicated at the right column and the number of the depressed pay key being indicated at the left. Where the operation of the machine is normal, that is, where the coins which are produced to make change are controlled entirely by the notch bars 35 etc., the coins are represented by plain circles, but where any coin is produced through the operation of a special clutch this is indicated by cross lines upon the disk or circle representing the coin.

As indicated in each chart or table the normal condition of the machine is such that the magazines of the first division are prepared to produce exactly one dollar and this is indicated in many of the charts in the upper row just under the numbers indicating the denomination of the different magazines.

Before proceeding to a description of the actual change making operation attention is called to the actual combinations which are met with in the practical use of the machine, and which must be negotiated by the machine. These combinations are indicated in the following table, in the left column of which is indicated the amount paid, or aggregate of the coins which are handed to the cashier in payment and this column is designated "Pay". In the right hand column is indicated the cost of the articles which may be paid for by the amount handed to the cashier, and this column contains two numbers indicating the range or capacity the machine must have corresponding to the opposite pay key, that is, the pay key in the same horizontal row. This column is designated "Cost". In the first line of the column below, it is indicated that in making change for $1 any amount from 1¢ to 99¢ must be returned to the customer. In making change for a 95¢ payment the cost of the article paid for may range in price from 86 to 94¢ and so on.

| Pay. | Cost. |
|---|---|
| $1.00 | From 1¢ to 99¢ inclusive. |
| .95 | From 86¢ to 94¢ " |
| .90 | From 81¢ to 89¢ " |
| .85 | From 76¢ to 84¢ " |
| .80 | From 71¢ to 79¢ " |
| .75 | From 51¢ to 74¢ " |
| .70 | From 61¢ to 69¢ " |
| .65 | From 56¢ to 64¢ " |
| .60 | From 51¢ to 59¢ " |
| .55 | From 46¢ to 54¢ " |
| .50 | From 1¢ to 49¢ " |
| .45 | From 36¢ to 44¢ " |
| .40 | From 31¢ to 39¢ " |
| .35 | From 26¢ to 34¢ " |
| .30 | From 21¢ to 29¢ " |
| .25 | From 1¢ to 24¢ " |
| .20 | From 11¢ to 19¢ " |
| .15 | From 1¹¢ to 14¢ " |
| .10 | From 1¢ to 9¢ " |
| .05 | From 1¢ to 4¢ " |

In the above table are included all the possible combinations which can occur. The manner in which the machine produces the change in each instance will be explained. It should be understood that the cost keys are depressed first, and the dime cost key should be depressed before a unit or cent cost key.

The $1.00 pay key affects no magazine clutches whatever, but simply closes the main clutch 23, so that when the driving shaft is rotated the ejecting devices will be operated.

Suppose that the article purchased costs 1¢, the cost key 1 being depressed, throws out the right hand dime gang clutch 22 and closes all the clutches of the second division of magazines. As soon as the dollar key is depressed it closes the main clutch 23, and upon rotation of the driving shaft 53 all of the coins in the magazines will be ejected, except 1¢ giving 99¢ change. Suppose that the article purchased cost 11¢, the cashier depresses the die key as indicated at 163 in Fig. 9. The shifting bar 36 corresponding to this key throws open the left hand dime magazine clutch 22 of the first division, as indicated, leaving the coins to come from the 50¢, 25¢, 10¢ and 5¢ magazines, that is, it leaves 90¢ to come from the machine. The subsequent depression of the 1¢ key as indicated at 164 will throw open the remaining closed dime clutch of the first division and throw in the clutches of all the magazines of the second division giving 89¢ change. The operation of making change in every other case from 11¢ up to $1 is exactly similar to this and is clearly indicated by the charts in Figs. 9 and 10 in which the operation is shown in steps, the first row of each operation showing the coins which would be produced by the machine after the depression of the dime key of the cost keys, and the second row showing the coins which will come forth after the proper cent key is depressed.

In making change from a payment of 95¢ as indicated in Fig. 11, change must be made for articles that cost from 86¢ to 94¢. When the 80¢ cost key is depressed, as indicated at 165, the notch bar 36 corresponding to this key throws open all the clutches 22 of the first division of magazines except the clutches of the two tens which gives the proper change for an 80¢ purchase from one dollar. When the 6¢ key is depressed as indicated at 166, one of the dime clutches is thrown open and the four penny clutches are thrown in or closed which gives 14¢, which is the correct change from one dollar. The depression of a 95¢ pay key has the effect of reducing the change by 5¢, and just at this point, one observes the utility of the 5-in clutch 110 and the 5-out clutch 109 illustrated in Fig. 8. As described above, and as illustrated in Figs. 4 and 5 the 6¢ cost key does not shift the bar 134 and therefore leaves the 5-in clutch closed (which has just been closed by the 80¢ cost key). Depressing the 95 pay key, through the medium of its notch bar 35 throws open the dime clutch which would produce a dime as indicated at 167, and at the same time the stem of the 95 pay key actuates the link 120 and the shaft 107 so as to actuate the 5-in clutch 110; hence the depression of this 95¢ key throws out 10¢ and throws in 5¢, as indicated at 168 in Fig. 11. A similar operation takes place in making change for an article costing 89¢ but in this table the operation is condensed into a single line.

In making change when 95 cents is paid for a 90¢ article the depression of the 90¢ cost key (indicated at 169) throws open all the clutches except the right hand dime clutch. As soon as the 95¢ key is depressed however, this dime clutch will be thrown open by the notch bar corresponding to this key and the 5-in clutch will be actuated so as to produce a 5¢ coin from the magazine as indicated at 170 in the table. When an article costs 91¢ and the payment is 95¢ the depression of the 90 cost key leaves one dime to come from the first division as indicated at 171. The depression of the 1¢ key throws out this dime through the operation of dog 71 (see Fig. 2) and throws in all the clutches of the second division so that 9¢ is left to come from the machine. The depression of the cent key will have the effect of throwing the 5-out clutch 109 into its closed position. The subsequent depression of the 95 pay key would therefore have the effect of throwing out the clutch of the nickel magazine of the first division but this magazine has already been thrown out of activity by the depression of the 90 cost key. Therefore through the operation of its notch bar the 95 pay key simply throws open the gang clutch 22 of the nickel magazine of the second division. The operation of making change from a 91¢ article up to a 94¢ article is similar to that just described but in the table the operation has been condensed into single lines.

Making change from a 90¢ payment is illustrated in Fig. 12 and is very simple, the range of the cost of the article being only from 81¢ to 89¢. The operation is graphically analyzed near the bottom of the table, where it is indicated that the depression of the 80¢ cost key leaves the two dime clutches of the first division closed as indicated at 172 and the depression of the 9¢ key simply throws open one of these dime clutches and throws in one of the 1¢ clutches. The operation of any of the other unit keys is similar to the operation of the 9¢ key. When the 90¢ pay key is subsequently depressed, its notch bar 35 simply opens the remaining dime clutch, leaving one cent change to be produced by the machine.

In making change from 85¢ for articles costing 76¢ to 84¢ the operation is illustrated in Fig. 13. A depression of the 70 cost key throws open the clutches of the 50¢ magazine, and the two dime magazines of the first division and leaves the 25¢ and 5¢ clutches closed. In connection with the 70¢ key, it should be remembered that this is a special key and its depression operates to shift the bar 101 shown in Fig. 6 to open the clutch 82$^a$ and close the clutch 83$^a$. This clutch 83$^a$ operates the dogs 94 and 95 and also the dogs 97 and 98 as indicated in Fig. 2. Therefore when the 6¢ cost key is depressed it actuates the link 86, and the dogs 94 and 95 throw open the 25¢ clutch and the 5¢ clutch, while the dogs 97 and 98 close the two dime clutches as indicated at 173 in Fig. 13. At the same time the notch bar 36 corresponding to the 6¢ cost key closes all the 1¢ clutches so that the machine is ready to produce 24¢ change. This is the correct change from $1. The depression of the 85¢ pay key will now reduce this amount by 15¢. This operation takes place as follows: Notch bar 35 of the 85¢ pay key directly engages the arms 20$^d$ and 20$^a$ and shifts the corresponding gang clutches 22 to their open position. This takes out 20¢. The machine also substitutes 5¢ for the 20¢ removed, as follows: It should also be understood that the depression of the 6¢ cost key will leave the 5-in clutch 110 closed, that is, in the position in which it has been put by the depression of the 70¢ cost key. Therefore the 5-in clutch will operate by the depression of the 85¢ pay key to throw in the gang clutch of the nickel magazine of the first division, as indicated at 174. This leaves 9¢ to come from the machine, which is the correct change. The operation from 76¢ up to 79¢ is similar to this, the notch bar of the depressed cent row key simply operating to vary the number of pennies produced by the machine to give the correct change.

In making change from an 85¢ payment for an article costing 80¢ the depression of the 80¢ key leaves two dimes to come from the first division and the depression of the 85¢ pay key simply throws open these two dime clutches and throws in the 5¢ magazine clutch through the operation of the 5-in clutch 110, the said 5-in clutch having been closed automatically by the depression of the 80¢ cost key.

The operation of making change from 85¢ for an article costing from 81¢ to 84¢ is very simple, and is normal, that is, no special clutches are called into play. The depression of the 80¢ cost key simply leaves the two dime clutches closed. The depression of the cent key opens one of the dime clutches and closes the nickel clutch of the second division and all the one cent clutches. The depression of the 85¢ pay key simply has the effect of operating through its notch bar to open the remaining dime clutch of the first division and the 5¢ clutch of the second division. The depression of the 85¢ pay key of course operates the 5-out clutch 109, but this has no effect on the change making operation as the nickel clutch of the first division is already open, having been opened by the depression of the 80¢ cost key.

In making change for an 80¢ payment from 71¢ to 79¢ the operation of the machine is special. The depression of the 70¢ cost key opens the proper clutches of the magazines of the first division through the operation of its notch bar 36 and leaves the 25¢ and 5¢ clutches closed. The reader is reminded that the 70 key is a special key and makes the effect of the subsequently depressed cent key abnormal, so that the depression of the 1¢ key following the 70¢ key actuates the link 86 to throw open the 25¢ and 5¢ clutches, and closes the two dime clutches as indicated at 175 in Fig. 14. The depression of the 80¢ pay key through its notch bar 35 opens both of the dime clutches, leaving 9¢ to be produced by the machine, which is the correct change.

The operation of making change from 71¢ to 75¢ is similar to this, the notch bar 36 of the cent key simply operating to close the proper 1¢ clutches of the second division. In the table Fig. 14 the operation of making the change from 76¢ is indicated. This is similar to that of making change for 71¢. The operation of making change for a 79¢ article is similar and is indicated condensed in the lower line of the table.

In making change for a 75¢ payment for an article costing from 50¢ to 69¢, the operation is normal. The depression of the 50¢ cost key opens only the 50¢ clutch, and 25¢ clutch, and leaves the two dime clutches and the nickel clutch of the first division closed, and when a cent cost key is depressed afterward it throws open one of the dime clutches and throws in the proper clutches of the second division. These operations are indicated for 51¢ and 61¢ purchases in the table. The making of change for a 75¢ payment for a 70¢ article is not illustrated in this table, but the first step is illustrated near the bottom of the table, at 176, that is, the depression of the 70¢ cost key leaves only the 25¢ and 5¢ clutches of the first division closed. Now when the 75¢ pay key is depressed it will not operate the special bar 150 but will, through its notch bar 35$^b$ open the 25¢ clutch only, leaving the 5¢ gang clutch closed, which will produce 5¢ from the nickel magazine of the first division. This operation is substantially similar to that of making change for 80¢ from an 85¢ payment which is illustrated in Fig. 13.

In making change from a payment of 75¢ for a 71¢ article, when the penny cost key is depressed after the 70 key it operates through the link 86 to throw open the 25¢ and the 5¢ clutch and throws in the two dime clutches as indicated at 177, and when the 75¢ pay key is depressed it operates through bar 150 to throw open the two dime clutches, and the clutch of the nickel magazine of the second division, leaving 4¢ change which is correct.

The operation of the machine in making change from a 70¢ payment for a 61¢ to 69¢ article is fully illustrated in Fig. 16 and is perfectly normal. The operation should be clearly understood from the foregoing description and the accompanying chart. The operation in making change for a 60¢ payment is perfectly normal and should be understood clearly from the foregoing description and from the charts shown in Figs. 17, 18 and 19.

In making change from 65¢ for a 61¢ charge, the depression of the 60¢ cost key opens the 50¢ and one dime clutch; the depression of the 1¢ cost key opens the remaining dime clutch and closes the 5¢ clutch of the second division and all the penny clutches. Depressing the 65¢ key opens the 25¢ clutch of the first division and the 5¢ clutch of the second division, and through the 5-out clutch opens the 5¢ clutch of the first division. A similar operation takes place for a 55¢ payment for a 51¢ article.

Figure 20:
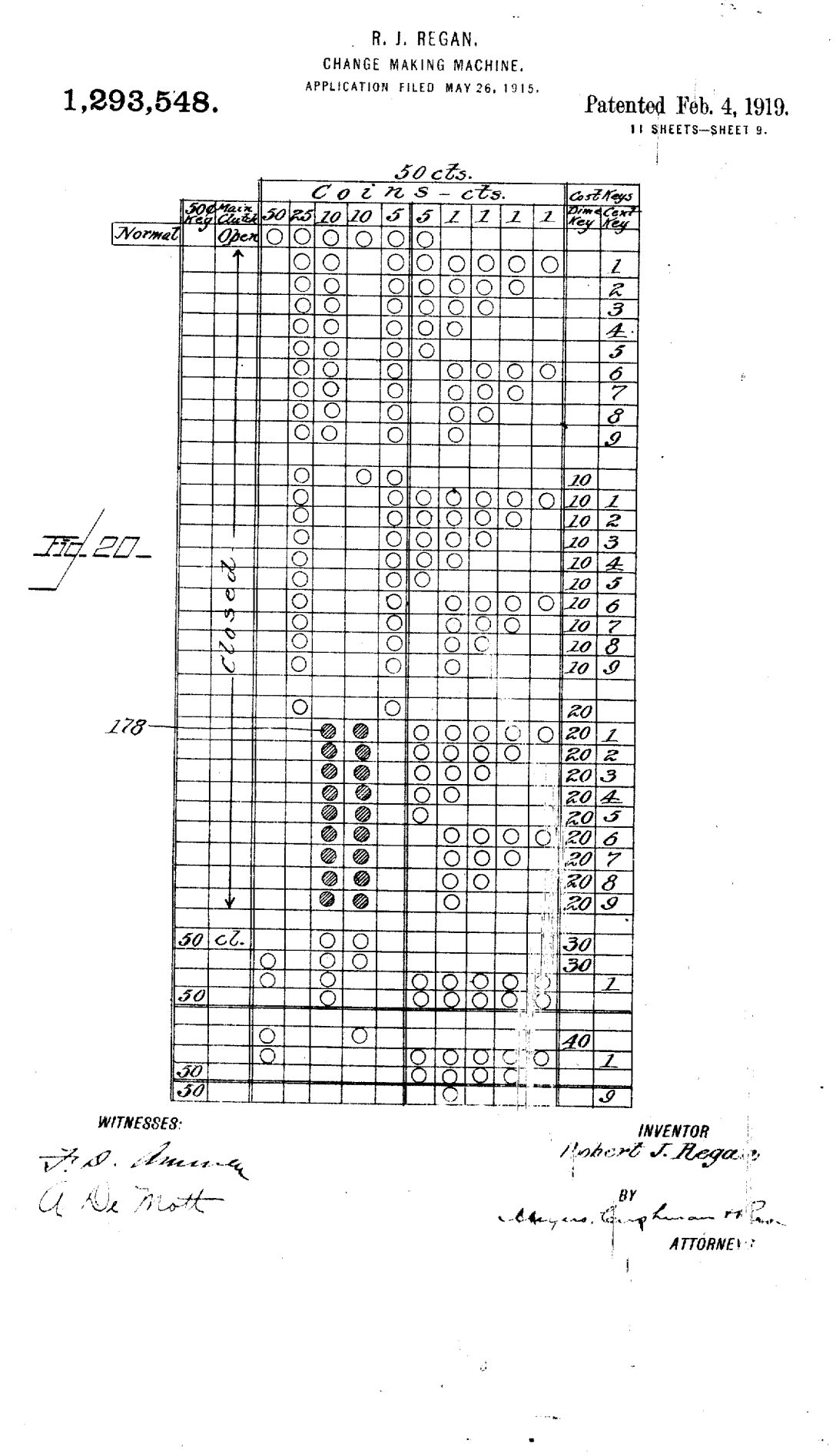

In making change for a 50¢ payment for articles costing from 1¢ to 49¢ the operation of the machine is illustrated in Fig. 20. For articles costing from 1¢ to 20¢ the operation of the machine is perfectly normal, and should be understood at once from an inspection of the charts. For articles costing from 21¢ to 29¢ the operation of the machine is special. The depression of the 20¢ key leaves only the 25¢ clutch and the 5¢ clutch of the first division closed. Attention is called to the fact that the 20 key is a special key which when followed by a cent key renders the operation abnormal. The depression of the one cent key operates through the link 86 to open the 25¢ clutch and the said 5¢ clutch and closes the two dime clutches as indicated at 178, Fig. 20. Through the operation of its notch bar 36 the one cent key throws in all the clutches of the second division so as to give the correct change. In this operation it will be noted that instead of eliminating 10¢ by opening a dime clutch the unit or cent key accomplishes the same result by substituting 20¢ for 30¢; and the remaining part of the effect of the one cent key is the same as before. The operation in making the change from 30¢ up to 39¢ is illustrated graphically in the table and is perfectly clear; likewise in making change from 40¢ to 49¢. In making change from a 45¢ payment for articles costing from 36¢ to 44¢ the operation of the machine is partly normal and partly abnormal. Where a 36¢ article is purchased the depression of a 30¢ cost key throws open the 25¢ and 5¢ clutches of the first division leaving 70¢ to come from the machine. The depression of the 6¢ key throws open one of the dime clutches in the usual manner and through its notch bar 36 throws in the four cent clutches of the second division. The depression of the 45¢ pay key throws open the 50¢ clutch and the remaining dime clutch of the first division through the operation of its notch bar 35, and simultaneously, through the operation of the 5-in clutch 110 it throws in the clutch of the nickel magazine of the first division, giving 9¢ change, which is correct.

The operation of making change for articles costing from 41¢ to 44¢ is perfectly normal as indicated in the table: the 5-out clutch of course operates but is ineffective as the gang clutch for the 5¢ magazine has already been thrown open by the depression of the 40¢ cost key.

The operation of making change from 31¢ to 39¢ upon a 40¢ payment is fully illustrated in Fig. 22 and is perfectly clear. The operation of making change for a 35¢ payment for an article costing from 26¢ to 34¢ is illustrated in Fig. 23 and is abnormal. The reader should remember that the 20¢ cost key is a special key. The depression of this key, through its notch bar 36, throws open the two dime clutches of the first division. When the 6¢ key is subsequently depressed it operates the link 86 in order to subtract 10, and substitutes two dimes for the 30¢ by closing the dime clutches as indicated at 179. The depression of the 20 key will have also set the 5-in clutch to operate, so that when the 35¢ pay key is depressed it operates the 5-in clutch to throw in 5¢ as indicated at 180. At the same time its notch bar 35 opens the two dime clutches. This leaves 9¢ to come from the machine, which is correct. The operation from 31¢ to 34¢ is perfectly normal. The depression of the 30¢ cost key leaves 70¢ to come from the machine in the form of a 50¢ piece and two dimes. The depression of the 1¢ key opens one of the dime clutches and throws in the nickel clutch and the four pennies from the second division. The depression of the 35¢ pay key, through its notch bar 35, then opens the clutches of the 50¢ magazines, both the dime magazines, and also the nickel magazine of the second division.

In making change from 30¢ for articles costing from 21¢ up, the operation of the machine is abnormal because the 20 key is a special key. As indicated in Fig. 24 the depression of the 20 key opens the two dime clutches and when the one cent key is subsequently depressed it opens the 25¢ and 5¢ clutches and closes the two dime clutches; at the same time, through its notch bar, throwing in 9¢ from the second division. The depression of the 30¢ pay key then opens all of the clutches that are closed in the first division. For 26¢ the operation is similar except that the 6¢ key does not close the 5¢ magazine clutches of the second division; and the operation is also similar for a 29¢ article leaving one cent change.

The making of change from a 25¢ payment for 1¢ and 11¢ is illustrated in Fig. 25. The operation of the machine is perfectly normal and should be clearly understood from the foregoing description and from the chart.

In making change from an article costing 21¢ or more the operation is abnormal as the 20¢ key is a special key. The depression of the 20¢ key opens the two dime clutches of the first division leaving 80¢ to come from the machine. The subsequent depression of the 1¢ key throws out the 25¢ and the 5¢ clutches and substitutes two dimes by closing the dime clutches through the medium of link 86. The depression of the 25¢ pay key operates through its notch bar 35 to open all the closed clutches except those of the penny magazines, leaving 4¢ to come from the machine.

The operation of the machine making change for costs from 1¢ to 9¢ is similar to that illustrated for 1¢; and likewise the operation of the machine is similar in making change for costs from 12¢ to 19¢ to that for making change for a cost of 11¢. The only differences in this respect affect the second division of magazines through the notch bars. The operation of making change from a 20¢ payment for articles costing from 11¢ to 19¢ is clearly illustrated in Fig. 26. It is perfectly normal and should be clearly understood from the chart and from the foregoing description.

For making change from 15¢ for an article costing from 11¢ up to 14¢ the operation of the machine is normal and similar to the operation illustrated in Fig. 26, that is, the depression of the 10¢ cost key opens the left hand dime clutch; the depression of the 1¢ key opens the right hand dime clutch and throws in all of the clutches of the second division. The depression of the 15¢ pay key operates through its notch bar 35 to open all the closed clutches except those of the penny magazines.

The operation of the machine in making change for payments of 10¢ and 5¢ is clearly illustrated in Figs. 28 and 29; these operations are perfectly normal and will be clearly understood from the tables or charts and from the foregoing description.

It is evident that in the mode of operation of this machine the setting of the ejecting devices is controlled entirely and solely by the numbered pay keys and cost keys, that is to say, no mental operations whatever in the nature of computing change are necessary. There are no special keys which must be depressed, depending upon certain relations of the amount received and the cost. Furthermore in the operation of the machine this complete control is effected by single actuations of the keys, that is to say, it is never necessary to depress any particular key more than once in one change-making operation.

What I claim and desire to secure by Letters Patent is:

1. In a machine of the class described, in combination, a plurality of magazines of different denominations, said denominations aggregating a predetermined amount, means normally set for ejecting the coins from said magazines, a plurality of cent cost keys, numbered progressively, means controlled by said cent keys for preventing said ejecting means from ejecting a predetermined coin in one of said magazines when other coins are to be ejected from other of said magazines and for simultaneously substituting coins for the coin withheld, the substituted coins aggregating less in value than the coin withheld corresponding to the number on said cent key.

2. In a machine of the class described, in combination, magazines for holding a plurality of coins of different denominations, the said denominations aggregating a predetermined amount, one of said magazines being adapted to hold dimes, a plurality of cent keys, numbered progressively, a second division of magazines adapted to hold coins of different denominations, ejecting devices for all of said magazines, means controlled by said cent keys for moving the ejecting mechanism of the dime magazine to prevent its ejecting a dime, and means controlled by the same key for actuating certain ejecting mechanisms of the magazines of said second division to substitute coins from said second division of magazines for the withheld dime.

3. In a machine of the class described, in combination, a plurality of magazines forming a first division to hold coins of different denominations, and aggregating one dollar, a plurality of magazines forming a second division and being of different denominations, a plurality of cent keys progressively numbered, ejecting devices for the magazines of the said first division normally set to eject the coins, mechanism for controlling said ejecting devices by said cent keys and affording means for unsetting said ejecting devices to withhold certain of the coins of said magazines of the said first division, and substituting mechanism for substituting certain coins from said magazines of said second division, having an aggregate value less than the value of the coin withheld.

4. In a machine of the class described, in combination, a plurality of magazines holding coins of different denominations, one of said magazines holding dimes, a second division of magazines including a magazine for holding 5¢ pieces and four penny magazines, a plurality of cent keys, an ejecting device for the dime magazine, normally set to eject a dime, means actuated by the said cent keys for rendering said ejecting device inactive, and means for ejecting certain of the coins from said second division of magazines, also controlled by said keys.

5. In a machine of the class described, in combination, a plurality of magazines for coins of different denominations, a plurality of ejecting devices, a member adapted to be moved to actuate said ejecting devices in unison, a plurality of keys, means controlled by said keys for rendering any of said ejecting devices inactive, a clutch controlling the operation of said member for actuating all of said ejecting devices in unison, and means for controlling said clutch by said keys.

6. In a machine of the class described, in combination, a plurality of magazines for coins of different denominations, a shaft, individual ejecting devices for said magazines, clutches on said shaft controlling said ejecting devices, a plurality of keys controlling the opening and closing of said clutches, a main clutch on said shaft and means for controlling said main clutch by said keys.

7. In a machine of the class described, in combination, a plurality of ejecting devices corresponding to coin magazines, a plurality of keys, a plurality of substantially parallel bars corresponding to said keys, clutches for controlling said ejecting devices, pivoted shift bars for actuating said clutches disposed transversely of said first named bars and swinging in a plane parallel to the plane in which said first bars collectively lie, means for actuating said shift bars by said first named bars, a main clutch through which said first named clutches may be actuated, and means for controlling said main clutch by said keys.

8. In a machine of the class described, in combination, a plurality of magazines for coins of different denominations, a plurality of keys, a plurality of substantially parallel shifting bars controlled by said keys, a plurality of ejecting devices corresponding to said magazines, a shaft, a plurality of clutches on said shaft for actuating said ejecting devices, members disposed transversely to said bars and connected with said clutches to open and close the same when said keys are actuated, a main clutch, means controlled by said keys for closing said main clutch, and means for actuating said ejecting devices through said main clutch.

9. In a machine for making change, in combination, a plurality of magazines for coins of different denominations, a plurality of pay keys and cost keys, a plurality of substantially parallel bars controlled by said keys and having oppositely disposed notches therein, a plurality of ejecting devices, a plurality of clutches controlling said ejecting devices, transverse shift bars lying across said parallel bars and passing successively through said notches, and connected with said clutches for opening or closing the individual clutches, and means for actuating said ejecting devices through said clutches.

10. In a machine of the class described, in combination, a plurality of magazines for coins of different denominations, a plurality of keys, a plurality of substantially parallel bars actuated by said keys and having notches therein, a plurality of ejecting devices corresponding to said magazines, a plurality of clutches controlling said ejecting devices, a plurality of transverse shift bars disposed in said notches connected with said clutches for controlling the same, a main clutch, a transverse shift bar for said main clutch, said notches receiving said shift bars to control said clutches.

11. In a machine of the class described, in combination, a plurality of fixed magazines constituting a first division, said magazines being of different denominations, having an aggregate value equal to the monetary unit, individual ejecting devices for said magazines, clutches controlling said ejecting devices, said clutches being normally closed, means for actuating said ejecting devices through said clutches to eject coins aggregating in value to the monetary unit, a plurality of magazines constituting a second division, ejecting devices corresponding to the same, a plurality of keys, means controlled by said keys for opening certain of said clutches to withhold certain coins of said first division and means for controlling said ejecting devices of said second division to substitute coins from said second division for the withheld coins of said first division.

12. In a machine of the class described, in combination, a plurality of fixed magazines constituting a first division, said magazines being of denominations having an aggregate value equal to the monetary unit, a plurality of ejecting devices corresponding to said magazines, individual clutches corresponding to said ejecting devices, and normally closed, means for actuating all of said ejecting devices to eject coins from said first division, aggregating to the monetary unit, a plurality of magazines constituting a second division and having coins of different denominations, a plurality of ejecting devices for said second division of magazines, a plurality of clutches corresponding to said last named ejecting devices, and a plurality of keys controlling said clutches.

13. In a machine of the class described, in combination, a plurality of magazines of different denominations, including a dime magazine, a plurality of magazines including a 5¢ magazine and four penny magazines, a plurality of cost keys numbered progressively from 1 to 9, ejecting devices in connection with said magazines respectively, the ejecting device of said dime magazine being normally set to eject a dime, means for preventing actuation of the ejecting device of said dime magazine controlled by said keys, and means for controlling the ejecting devices of the said 5¢ magazine and said penny magazines, by said keys.

14. In a machine of the class described, in combination, a plurality of magazines of different denominations independently movable individual ejecting devices for said magazines, a plurality of pay keys and cost keys, means actuated thereby for directly engaging and rendering certain of said ejecting devices inactive while simultaneously rendering other ejecting devices for said magazines active, a second division of magazines for coins of different denominations, ejecting devices for the same and means for controlling said last named ejecting devices by said keys.

15. In a machine of the class described, in combination, a plurality of magazines of different denominations, including a 25¢ magazine, a 5¢ magazine and two dime magazines, independently movable ejecting devices for said magazines, a plurality of pay keys and cost keys, and means controlled by said keys for rendering the ejecting devices of said 25¢ magazine and said 5¢ magazine inactive and simultaneously rendering the ejecting devices of said dime magazines active to effect a reduction of 10¢ in the total of the coins ejected.

16. In a machine of the class described, in combination, a plurality of magazines of different denominations, including a 25¢ magazine, and a 5¢ magazine, and including two dime magazines, independently movable ejecting devices for said magazines, a plurality of pay keys and cost keys and means controlled by said keys for rendering the ejecting devices of said 25¢ magazines and said 5¢ magazine inactive and simultaneously rendering the ejecting devices of said dime magazines active to effect a reduction of 10¢ in the total of the coins ejected, and a second division of magazines for coins of different denominations, ejecting devices therefor, and means for controlling the said last named ejecting devices by said keys.

17. In a machine of the class described, in combination, a plurality of magazines, of different denominations, including two dime magazines, a 25¢ magazine and a 5¢ magazine, ejecting devices for said magazines, the denominations of said magazines aggregating one dollar, ejecting devices for said magazines, respectively, a 70¢ cost key, means actuated thereby for rendering inactive the ejecting devices of said 25¢ magazine and said 5¢ magazine, a plurality of cent cost keys, and means controlled by said cent keys for rendering inactive the ejecting devices of said 25¢ magazine and said 5¢ magazine, and simultaneously rendering active the ejecting devices of the said dime magazines.

18. In a machine of the class described, in combination, a plurality of magazines of different denominations, including two dime magazines, a 25¢ magazine and a 5¢ magazine, ejecting devices for said magazines, the denominations of said magazines aggregating one dollar, ejecting devices for said magazines, a 70¢ cost key, means controlled thereby for inhibiting the ejecting devices of said 25¢ magazine and said 5¢ magazine, a plurality of cent cost keys, and means controlled by said cent keys for inhibiting the ejecting devices of said 25¢ magazine and said 5¢ magazine, and simultaneously rendering active the ejecting devices of the said dime magazines, a second division of magazines for coins of different denominations, and means for controlling the ejection of coins therefrom by said cent keys.

19. In a machine of the class described, in combination, a plurality of magazines for coins of different denominations, including a 25¢ magazine, a 5¢ magazine, and two dime magazines, a plurality of cost keys, ejecting devices in connection with said magazines, means actuated by said keys to inhibit said ejecting devices, mechanism for controlling in common the ejecting devices of said 25¢ magazine and said 5¢ magazine, mechanism for controlling in common the ejecting mechanisms for said two dime magazines, to effect a subtraction of 10¢ by substituting two dimes for the 25¢ piece and the 5¢ piece, and means for controlling said last two named mechanisms through the medium of said keys.

20. In a machine of the class described, in combination, a plurality of magazines, including a 25¢ magazine, a 5¢ magazine and two dime magazines, means for normally ejecting coins from all of said magazines, a plurality of keys and means controlled by said keys for withholding the 25¢ coins and the 5¢ coins and substituting two dime coins therefor, to effect a subtraction of 10¢ from the coins ejected.

21. In a machine of the class described, in combination, a plurality of magazines for coins of different denominations, means for normally ejecting coins from all of said magazines to aggregate one dollar, and including a 5¢ coin, a 25¢ coin, and two dimes, a 70¢ cost key and a 20¢ cost key, means controlled thereby for reducing the aggregate of the coins ejected by 70¢ and 20¢ respectively, mechanism controlled by said 70¢ key and said 20¢ key for substituting the ejection of two dimes for the 25¢ and the 5¢ coin, a plurality of cent keys, and means for actuating said last named mechanism by said cent keys.

22. In a machine of the class described, in combination, a plurality of magazines for coins of different denominations, including a 25¢ magazine, a 5¢ magazine and two dime magazines, means for normally ejecting coins from all of said magazines to aggregate one dollar, a 70¢ cost key and a 20¢ cost key, pay keys, means actuated by said pay keys to reduce the aggregate of said coins when ejected, substituting mechanism controlled by said 70¢ key and said 20¢ key for substituting two dimes for a 25¢ coin and a 5¢ coin, a plurality of cent keys, and means for actuating said substituting mechanism by said cent keys.

23. In a machine of the class described, in combination, a plurality of magazines for coins of different denominations, aggregating one dollar, a plurality of ejecting devices corresponding to said magazines, clutches controlling said ejecting devices, a 70¢ cost key and a 20¢ cost key, means actuated thereby for controlling said clutches, said magazines including a 25¢ magazine, a 5¢ magazine and two dime magazines, substituting mechanism for inhibiting the ejecting devices of said 25¢ magazine, and said 5¢ magazine, and for throwing into action the ejecting devices of said two dime magazines, a plurality of cent keys, and means for actuating said substituting mechanism by said cent keys.

24. In a machine of the class described, in combination, a plurality of magazines of different denominations, aggregating one dollar, said magazines including a 25¢ magazine and a 5¢ magazine and two dime magazines, a plurality of dime cost keys including a 70¢ key and a 20¢ key, ejecting devices for said magazines, means for controlling said ejecting devices by said dime keys, substituting mechanism for simultaneously rendering the ejecting devices of said 25¢ and said 5¢ magazines inactive, and rendering the ejecting devices of said 10¢ magazines active, means for controlling said substituting mechanism by said 70¢ key and said 20¢ key, a plurality of cost keys, and means for actuating said substituting mechanism by certain of said keys.

25. In a machine of the class described, in combination, a plurality of magazines of different denominations, aggregating one dollar, means for normally ejecting a coin from all of said magazines, a 70¢ cost key and a 20¢ cost key, means actuated by said cost keys for withholding certain of said coins, said magazines including a 25¢ magazine, a 5¢ magazine and two dime magazines, a plurality of cent keys adapted to be struck after said 70¢ key and said 20¢ key, and means controlled by said cent keys to substitute two dimes for a 25¢ piece and a 5¢ piece when ejected from said magazines.

26. In a machine of the class described, in combination, a plurality of coin-ejecting devices, including ejecting devices for a 25¢ and a 5¢ coin, a plurality of dime cost keys, including a 70¢ key and a 20¢ key, a plurality of cent keys adapted to be depressed after said dime keys, said ejecting devices also including two dime ejecting devices, means for normally rendering one of said dime ejecting devices inactive by the depression of any of said cent keys, a second set of ejecting devices for ejecting coins of different denominations normally controlled by said cent keys, means controlled by said 70¢ key and said 20¢ key for ejecting two dimes instead of a 25¢ coin and a 5¢ coin, and means for actuating said last named means through the medium of said cent keys.

27. In a machine of the class described, in combination, a plurality of magazines for 25¢ pieces, 5¢ pieces and dimes respectively, ejecting devices in connection with said magazines, a plurality of cent keys, a second division of magazines including a 5¢ magazine and four penny magazines, a plurality of cent keys, a plurality of dime keys, means actuated by the depression of said dime keys for inhibiting the ejecting device of one of said dime magazines, means controlled by the depression of said cent keys for controlling the ejection of coins from said second division of magazines, said dime keys including a 70¢ key and a 20¢ key, means controlled by said 70¢ key and said 20¢ key for inhibiting one of the said dime ejecting devices, substituting mechanism also controlled by the said 70¢ key and said 20¢ key for rendering said dime ejecting devices active and for inhibiting said 25¢ and said 5¢ ejecting devices, and means controlled by said cent keys for actuating said substituting mechanism.

28. In a machine of the class described, in combination, a mechanism for individually ejecting coins including a 25¢ piece, two dimes and a 5¢ piece, a plurality of dime cost keys including a 70¢ key and a 20¢ key, means actuated by all of said keys for controlling the said ejecting mechanisms, a plurality of cent keys, a second ejecting mechanism, for ejecting a second 5¢ piece and four pennies, means controlled by said cent keys for normally effecting said first ejecting mechanism to withhold one of said dimes and controlling said second ejecting mechanism, substituting mechanism controlled by said 70¢ key and said 20¢ key for effecting said first ejecting mechanism to eject two dimes instead of a 25¢ coin and a 5¢ coin, and means for actuating said substituting mechanism by said cent keys when depressed subsequently to said 70¢ key and said 20¢ key.

29. In a machine of the class described, in combination, a plurality of magazines for different coins, a plurality of dime cost keys including normal dime keys and special dime keys, a plurality of cent keys adapted to be depressed subsequently to said dime keys, means for normally making change by ejecting coins controlled by said normal dime keys and said cent keys, substituting mechanism adapted to withhold certain coins and substitute others aggregating in value less than the withheld coins, and means for controlling said substituting mechanism by said special dime keys and said cent keys.

30. In a machine of the class described, in combination, a division of magazines for coins of different denominations, including a dime magazine, a plurality of normal dime keys and a special dime key, said magazines including a dime magazine, a plurality of cent keys adapted to be depressed subsequently to the depressing of said dime keys, a second division of magazines, means for normally making change by withholding a dime in said dime magazine, and ejecting coins from said second division of magazines controlled by said cent keys when depressed after a normal dime key, substituting mechanism for substituting the ejection of certain coins from said first division, for others of said first division, and means for controlling said substituting mechanism by said special dime key and said cent keys.

31. In a machine of the class described, in combination, a division of magazines for coins of different denominations, including a dime magazine, a second division of magazines for coins of different denominations, a plurality of cent keys, withholding means for withholding the dime of said dime magazine controlled by said cent keys, means for ejecting coins from said second division controlled by said cent keys, a plurality of dime keys including normal dime keys and special dime keys, means for controlling the ejection of coins from said first division actuated by said dime keys, substituting mechanism for substituting the ejection of certain coins of said first division for others, means controlled by said special dime keys for disconnecting said withholding means and connecting said substituting mechanism, and means for actuating said substituting mechanism by said cent keys.

32. In a machine of the class described, in combination a plurality of magazines for coins of different denominations, ejecting mechanism corresponding thereto including a 5¢ ejecting device, a plurality of pay keys and cost keys, a plurality of members corresponding to the keys and actuated normally by the depression of said keys respectively for controlling said ejecting devices directly, a special controlling device for the said 5¢ ejecting device, means for controlling the same through the agency of certain of said keys, and means for actuating said special controlling device through the depression of certain of said keys.

33. In a machine of the class described, in combination, a plurality of magazines including a 5¢ magazine, an ejecting device including a 5¢ ejecting device for said 5¢ magazine, a special controlling device for said 5¢ ejecting device, operating to prevent or permit the ejection of a single coin from said 5¢ magazine, a plurality of pay keys and cost keys including dime keys, means actuated by said dime keys for controlling said special controlling device, a plurality of cost keys including cent keys, and means for controlling said special controlling device through the actuation of a plurality of said cent keys.

34. In a machine of the class described, in combination, a plurality of magazines including a 5¢ magazine, ejecting mechanism including a 5¢ ejecting mechanism corresponding to said 5¢ magazine, a special controlling device for said 5¢ ejecting mechanism operating to prevent or permit the ejection of a single 5¢ coin from said 5¢ magazine, and including a clutch through which said 5¢ ejecting mechanism may be controlled, a plurality of pay keys and cost keys and means for controlling the closing or opening of said clutch through the operation of a plurality of said keys.

35. A change-making machine comprising in combination, a 5¢ magazine, an ejecting device therefor comprising a clutch and an arm adapted to throw said clutch in or out, a plurality of pay keys and cost keys including cent keys and dime keys, a special controlling device adapted to actuate said arm to control said clutch, means for controlling said special controlling device by said dime keys, and means for controlling said special controlling device through the action of certain of said cent keys.

36. In a change-making machine in combination, a 5¢ magazine, ejecting mechanism in connection with said magazine, a plurality of pay keys and cost keys including cent keys and dime keys, means for controlling said ejecting mechanism by said dime keys, and means for controlling said ejecting mechanism by the depression of certain of said cent keys, said dime keys and said last named cent keys constituting the sole means for controlling said ejecting mechanism before the ejection of the coins by said ejecting mechanism.

37. In a change-making machine in combination, a 5¢ magazine, an ejecting mechanism therefor, a plurality of dime keys, means actuated by said dime keys for effecting said ejecting mechanism to cause the ejectment of a 5¢ piece, a plurality of cent keys and means actuated by certain of said cent keys affecting said ejecting mechanism to prevent the ejectment of a 5¢ piece, said last named cent keys and said dime keys constituting the sole means for controlling said ejecting mechanism before the ejection of the coins by said ejecting mechanism.

38. In a change-making machine in combination, a 5¢ magazine, a 5¢ ejecting mechanism therefor, a plurality of dime keys affecting said 5¢ ejecting mechanism so as to eject a 5¢ piece when actuated, a plurality of cent keys numbered consecutively from one to four, and means actuated by said cent keys for affecting said 5¢ ejecting device to prevent the ejectment of a 5¢ piece when said ejecting mechanism is actuated.

39. In a change-making machine in combination, a 5¢ magazine, a 5¢ ejecting mechanism for said magazine, a dog for throwing said ejecting mechanism into active relation, a second dog for throwing said ejecting mechanism into inactive relation, a plurality of pay keys and cost keys, and means for operating said dogs through the agency of said keys.

40. In a change-making machine in combination, a 5¢ magazine, a 5¢ ejecting mechanism therefor, a five-out clutch for controlling said ejecting mechanism to prevent the ejectment of a 5¢ piece thereby, a five-in clutch controlling said ejecting mechanism to cause the ejectment of a 5¢ piece, a plurality of keys, and means for controlling said clutches.

41. In a change-making machine in combination, a 5¢ magazine, a 5¢ ejecting mechanism therefor, a five-out clutch for controlling said ejecting mechanism to prevent the ejectment of a 5¢ piece thereby, a five-in clutch controlling said ejecting mechanism to cause the ejectment of a 5¢ piece, and means for controlling said clutches through the actuation of certain of said keys.

42. In a machine of the class described, in combination, a plurality of magazines for coins of different denominations, including a 5¢ magazine, a plurality of pay keys, a plurality of cost keys, a plurality of ejecting mechanism corresponding to said magazines, means for directly controlling the said ejecting mechanism by the depression of said keys, said mechanism including a 5¢ magazine, a special controlling device for said 5¢ magazine, means for controlling said special controlling device through the depression of certain of said keys, and means for actuating said special controlling device through the actuation of others of said keys.

43. In a machine of the class described, in combination, a plurality of magazines for coins of different denominations, a plurality of pay keys, a plurality of cost keys, said magazines including a dime magazine and a 5¢ magazine, a special dime controlling device for said dime magazine, a special 5¢ controlling device for said 5¢ magazine, means for controlling said controlling devices actuated by certain of said keys, and means for actuating said controlling devices by others of said keys.

44. In a machine of the class described, in combination, a plurality of magazines for coins of different denominations, forming a division and aggregating one dollar, said magazines including a dime magazine and a 5¢ magazine, a second division of magazines including a 5¢ magazine and four penny magazines, a plurality of ejecting devices for ejecting coins from said magazines, a plurality of pay keys and cost keys controlling the ejectment of coins from said magazines, a special dime controlling device in connection with said dime ejecting mechanism, a special 5¢ controlling device in connection with said 5¢ ejecting mechanism, means for controlling said special controlling devices through the depression of certain of said keys, and means for actuating said special controlling devices through the depression of others of said keys.

45. In a machine of the class described, in combination, a plurality of magazines constituting a division for holding coins of different denominations aggregating one dollar, and including a dime magazine and a 5¢ magazine, ejecting mechanisms including a 5¢ ejecting and a dime ejecting mechanism in connection respectively with said 5¢ magazine and said dime magazine, a second division of magazines including a 5¢ magazine and four penny magazines, a plurality of ejecting mechanisms for said last named magazines, a special dime controlling device in connection with said dime ejecting mechanism, a special 5¢ controlling device in connection with said 5¢ ejecting mechanism, a plurality of keys, means actuated thereby for directly controlling all of said ejecting mechanisms, means actuated by certain of said keys for controlling said controlling devices, and means actuated by others of said keys for actuating said controlling devices.

46. In a machine of the class described, in combination, a 5¢ magazine, an ejecting mechanism therefor, a special controlling device for setting said ejecting mechanism in an active or inactive relation, a plurality of cost keys, means actuated thereby for controlling said special controlling device, a plurality of pay keys numbered to indicate the payments respectively of 35¢, 45¢, 55¢, 65¢, 85¢ and 95¢, for controlling said ejecting mechanisms, and means actuated by said pay keys for controlling said controlling device.

47. In a machine of the class described, in combination, a 5¢ magazine, an ejecting mechanism therefor, a special controlling device for setting said ejecting mechanism in an active or an inactive relation, a plurality of cost keys, means actuated thereby for controlling said special controlling device, a plurality of pay keys numbered to indicate the payments respectively of 35¢, 45¢, 55¢, 65¢, 85¢, and 95¢, means actuated by said cost keys for controlling said controlling device, and means actuated by said pay keys for controlling said controlling device, a 25¢ pay key, and a 75¢ pay key adapted to be depressed and independent of said controlling device, a plurality of magazines for coins of different denominations, and having ejecting mechanisms, and means actuated by said 25¢ key and said 75¢ key for controlling said last named ejecting mechanisms.

48. In a machine of the class described, in combination, a 5¢ magazine, and ejecting mechanism therefor, a special controlling device for setting said ejecting mechanism in an active or an inactive relation, a plurality of cost keys, means actuated thereby for controlling said special controlling device, a plurality of pay keys numbered to indicate the payments respectively of 35¢, 45¢, 55¢, 65¢, 85¢ and 95¢, means actuated by said cost keys for controlling said controlling device and means actuated by said pay keys for actuating said controlling device, a 25¢ pay key, a 75¢ pay key adapted to be depressed and leaving said controlling device unaffected, a plurality of magazines for coins of different denominations and having ejecting mechanisms, and means actuated by said 25¢ key and said 75¢ key for controlling said last named ejecting mechanisms, said cost keys including a 70¢ key and a 20¢ key, and means actuated by said 70¢ cost key and said 20¢ cost key for affecting the action of said 25¢ pay key and said 75¢ pay key.

49. In a machine of the class described, in combination, a plurality of magazines for coins of different denominations, including a 5¢ magazine, a plurality of pay keys including pay keys numbered 35¢, 45¢, 55¢, 65¢, 85¢ and 95¢, a plurality of ejecting mechanisms including a 5¢ ejecting mechanism, ejecting mechanisms for the remainder of said magazines, a plurality of cost keys, means for controlling all of said mechanisms by the depression of all of said keys, a special controlling device for said 5¢ ejecting mechanism, means for controlling the same by certain of said cost keys, means for actuating said special controlling device by the depression of all of said named pay keys, a 25¢ pay key and a 75¢ pay key the depression of which leaves said special controlling device unaffected, said cost keys including a 20¢ key and a 70¢ key, means actuated by said 25¢ pay key and said 75¢ pay key for controlling said ejecting mechanisms, and means for affecting the same through the depression of said 20¢ cost key and said 70¢ cost key.

50. In a machine of the class described, in combination, a plurality of magazines for coins of different denominations, a plurality of pay keys including a 75¢ pay key and a 25¢ pay key, a pluraltiy of ejecting mechanisms in connection with said magazines, means actuated by said pay keys for controlling said ejecting mechanisms, a plurality of cost keys, members actuated thereby for controlling said ejecting mechanism, said cost keys including a 70¢ key and a 20¢ key, a special member for controlling certain of said ejecting mechanisms, means for controlling the same by deprection of said 70¢ key and said 20¢ key, and means for actuating said special member by said 75¢ key and said 25¢ key.

51. In a machine of the class described, in combination, a plurality of magazines for coins of different denominations, a plurality of ejecting mechanisms corresponding thereto, a plurality of pay keys including a 75¢ key and a 25¢ key, a plurality of cost keys, a plurality of bars actuated by all of said keys for controlling said ejecting mechanisms, a special bar for controlling certain of said ejecting mechanisms, means for actuating said special bar by said 25¢ key and said 75¢ key, said cost keys including a 70¢ key and a 20¢ key, and means for controlling the operation of said special bar through the depression of said 70¢ and said 20¢ keys.

52. In a machine of the class described, in combination, a plurality of magazines for coins of different denominations, including a 25¢ magazine, a 5¢ magazine and two dime magazines, means for ejecting coins from all of said magazines, a plurality of cost keys, a substituting mechanism for substituting the ejection of dimes from said dime magazines instead of the ejection of a 25¢ coin and a 5¢ coin, means for controlling said substituting mechanism by certain of said cost keys, a plurality of normal pay keys, means actuated thereby for controlling the ejection of coins from said magazines, special pay keys, special means actuated thereby for controlling the ejection of coins, and means for affecting said special means through the action of said substituting mechanism.

53. In a machine of the class described, in combination, a plurality of magazines for coins of different denominations, a plurality of cost keys including a special 20¢ and a special 70¢ key, a plurality of ejecting devices corresponding to said magazines, means for controlling the same by the depression of said cost keys, a plurality of pay keys including a special 25¢ key and a special 75¢ key, means for controlling said ejecting devices through the depression of said pay keys, a special controlling device for said ejecting mechanism, means for controlling the same by the depression of said 20¢ key and said 70¢ key, and means for actuating said special controlling device by the depression of said 25¢ key and said 75¢ key.

54. In a machine of the class described, in combination, a plurality of magazines for coins of different denominations, a plurality of ejecting mechanisms corresponding to said magazines, a plurality of cost keys including a 20¢ key and a 70¢ key, a plurality of pay keys including a special 25¢ key and a special 75¢ key, a plurality of bars actuated by all of said keys and controlling said ejecting mechanisms including a special bar, means which may be actuated in common by said 25¢ key and said 75¢ key for moving said special bar, and means for controlling the operation and non-operation of said special bar controlled by said 20¢ key and said 70¢ key.

55. In a machine of the class described, in combination, a plurality of magazines for coins of different denominations, a plurality of ejecting devices corresponding thereto, a plurality of cost keys including a special 20¢ key and a special 70¢ key, a plurality of pay keys including a special 25¢ key and a special 75¢ key, a plurality of bars actuated by all of said keys to control said ejecting devices, a special bar for controlling said ejecting devices, a movable dog enabling said 25¢ key and said 75¢ key to actuate said special bar, and means for controlling said dog by said 20¢ key and said 70¢ key.

56. In a machine of the class described, in combination, a plurality of magazines for coins of different denominations, a shaft, a plurality of clutches arranged on said shaft and corresponding to said magazines, ejecting devices actuated by said clutches, a plurality of keys, means actuated by said pay keys and cost keys including penny keys for closing some of said clutches and opening some of said clutches to effect the making of change corresponding to the difference in the amounts indicated by the pay keys and cost keys that are depressed, means for actuating said ejecting devices through said clutches, and means for returning said clutches to their normal position after said ejecting devices are actuated.

57. In a machine of the class described, in combination, a plurality of magazines for coins of different denominations, a plurality of ejecting mechanisms therefor, a plurality of clutches controlling said ejecting mechanisms, a plurality of number keys controlling said clutches, a main clutch, means for closing said main clutch through the action of certain of said keys, means for actuating said ejecting mechanisms through said main clutch, and means for returning all of said clutches to their normal position after said ejecting mechanisms have been actuated.

58. In a machine of the class described, in combination, a plurality of magazines for coins of different denominations, a plurality of ejecting mechanisms therefor, a plurality of clutches corresponding to said ejecting mechanisms, a plurality of cost keys, a plurality of pay keys, means for controlling said clutches actuated by said cost keys and said pay keys, a main clutch through which said first named clutches may be actuated, means for actuating said ejecting mechanisms through said main clutch, means for controlling said main clutch actuated by said pay keys, and means for returning all of said clutches to their normal position after said ejecting mechanisms are actuated.

59. In a machine of the class described, in combination, a plurality of magazines for coins of different denominations, a plurality of ejecting mechanisms therefor, a shaft, a plurality of clutches corresponding to said ejecting mechanisms, mounted on said shaft, a plurality of keys, a plurality of substantially parallel bars actuated by said keys, transverse movable bars actuated by said parallel bars and connected with said clutches to actuate the same, means for actuating said ejecting mechanisms through said clutches, and a shaft having a plurality of cams for returning said transverse movable bars to their normal position after said ejecting mechanisms have been actuated.

60. In a machine of the class described, in combination, a plurality of magazines for coins of different denominations, a plurality of ejecting mechanisms therefor, a plurality of clutches corresponding to said ejecting mechanisms, a plurality of keys, a plurality of substantially parallel bars actuated by said keys, transversely disposed pivoted arms actuated by said bars, clutches connected therewith, means actuated by said clutches for actuating said ejecting mechanisms, and a shaft having a plurality of cams for returning said pivoted arms to their normal position after said ejecting mechanisms have been actuated.

61. In a machine of the class described in combination, a plurality of magazines, including a dime magazine, ejecting mechanisms corresponding to said magazines, and including a dime ejecting mechanism, a plurality of cent cost keys, means actuated thereby for controlling said dime ejecting mechanism and operating to effect the ejection or non-ejection of a dime from said dime magazine and including a movable member moved in common by any one of said keys, means for actuating said ejecting mechanisms, and means for returning said movable member to its normal position after said ejecting mechanisms have been actuated.

62. In a machine of the class described, in combination, a plurality of magazines for coins of different denominations, ejecting mechanisms therefor said magazines including a dime magazine, a clutch controlling the ejecting mechanism for said dime magazine to prevent the ejection of a dime, and operating to effect the ejection or non-ejection of one dime from said dime magazine, a plurality of keys, means for controlling said clutch by the operation of said keys, and including a movable member, moved in common by any one of said keys, means for actuating said ejecting mechanisms, and means for returning said movable member to its normal position after said ejecting mechanisms have been actuated.

63. In a machine of the class described, in combination, a plurality of magazines for coins of different denominations, a plurality of ejecting mechanisms corresponding thereto, a clutch controlling the ejecting mechanism of one of said magazines, a plurality of pay keys and cost keys, adapted to render said ejecting mechanisms active, a movable member adapted to be displaced by the depression of said keys, and controlling said clutch, substituting mechanism opposing the effect of said keys, and for simultaneously substituting the actuation of certain ejecting mechanisms for others of said ejecting mechanisms to substitute coins having a lower aggregate value, means for controlling said substituting mechanism by certain of said keys, means for actuating said ejecting mechanisms, and means for returning said movable member to its normal position after the actuation of said ejecting mechanisms.

64. In a machine of the class described, in combination, a plurality of magazines for coins of different denominations, including a dime magazine, a plurality of ejecting mechanisms corresponding to said magazines, a plurality of keys, a special controlling device for the dime ejecting mechanism, a clutch controlling the same, a substituting mechanism for actuating certain of said ejecting mechanisms, to substitute coins having a lower aggregate value, a clutch controlling the same, means for actuating said clutches in unison simultaneously, means for controlling the same through the actuation of certain of said keys, means for actuating said ejecting mechanisms, and means for returning said clutches to their normal position after said ejecting mechanisms have been actuated.

65. In a machine of the class described, in combination, a plurality of magazines for coins of different denominations, ejecting mechanisms therefor, a plurality of cost keys, including a 20¢ cost key and a 70¢ cost key, said magazines including two dime magazines, a 25¢ magazine and a 5¢ magazine, substituting mechanism for controlling the ejecting mechanisms of said 25¢ magazine and said 5¢ magazine, and also controlling the ejecting mechanisms of said dime magazines, means for controlling said substituting mechanism by the actuation of said 20¢ cost key and said 70¢ cost key, including a movable member, and means for returning said movable member to its normal position.

66. In a machine of the class described, in combination, a plurality of magazines for coins of different denominations, a plurality of ejecting mechanisms corresponding thereto, a plurality of pay keys, including a 75¢ key and a 25¢ key, a plurality of cost keys, means actuated by said keys for controlling said ejecting mechanisms, a special member for controlling certain of said ejecting mechanisms, means for actuating said special member by said 25¢ key, and said 75¢ key, a plurality of cost keys, including a 20¢ key and a 70¢ key, a movable member for controlling the operation of said special member through the depression of said 20¢ key and said 70¢ key, means for actuating said ejecting mechanisms, and means for returning said movable member to its normal position after said ejecting mechanisms have been actuated.

67. In a machine of the class described, in combination, a plurality of magazines for coins of different denominations, a plurality of ejecting mechanisms corresponding to said magazines, a plurality of cost keys, including a 20¢ cost key and a 70¢ cost key, a plurality of pay keys, including a special 25¢ pay key and a special 75¢ pay key, a plurality of bars actuated by all of said keys and controlling said ejecting mechanisms, a special bar for controlling said ejecting mechanisms, means which may be actuated in common by said 25¢ key and said 75¢ key for moving said special bar, a movable member for controlling the operation and non-operation of said special bar controlled by said 20¢ key and said 70¢ key, means for actuating said ejecting mechanisms, and means for returning said movable member to its normal position after the actuation of said ejecting mechanisms.

68. In a machine of the class described, in combination, a plurality of coin-magazines, a plurality of ejecting mechanisms, a plurality of pay keys, including a 25¢ pay key and a 75¢ pay key, a plurality of cost keys including a 20¢ cost key and a 70¢ cost key, a substituting device controlling said ejecting devices and controlled by said 20¢ cost key and said 70¢ cost key; a common bar actuated in common by said 25¢ pay key and said 75¢ pay key, means for controlling said ejecting mechanisms with said common bar, a dog coöperating with said common bar to connect the same with said 25¢ key and said 75¢ key for actuation thereby, means for advancing said dog controlled by said 20¢ key and said 70¢ key, means for actuating said ejecting mechanisms, and means for returning said dog.

69. In a machine of the class described, the combination of a plurality of fixed magazines disposed in a substantially vertical position and open at their upper ends to permit the same to be charged with coins while the machine is in operation, said magazines being of tubular form and having diameters corresponding to coins of different denominations, a set of depressible successively numbered pay keys to represent amounts paid to the cashier, a set of successively paid depressible cost keys to represent numbered the cost of the article sold, individual ejectors for said magazines, a shaft, clutches carried thereby corresponding respectively to said ejectors, each of said clutches including a clutch member mounted to slide on said shaft, a push-rod connecting each individual ejector with its corresponding clutch member and controlled solely and directly by single actuations of the said keys, and special controlling mechanism controlled solely by single actuations of certain of said numbered keys for controlling said ejectors to set them to eject the correct change in all possible combinations from the smallest coin value up to the monetary unit.

70. In a machine of the class described, in combination, magazines for coins of different denominations, depressible pay keys bearing numbers indicating the amount paid to the cashier, depressible cost keys bearing numbers indicating the cost, individual ejectors for said magazines having individual clutches, said cost keys operating to close said clutches selectively to set said ejectors for ejecting coins, said cost keys including special keys, means actuated by said special keys for opening certain of the clutches after being closed by the operation of a cost key, and thereby effect the setting of said ejectors for the proper change in all combinations of change from the smallest coin value up to the monetary unit, and mechanism for actuating said ejectors after being set, to eject the coins.

71. In a machine for making change, in combination, a plurality of fixed magazines of different denominations, such that the sum composed of a single coin from each magazine aggregates one dollar, means normally set to eject a coin from each of said magazines, a plurality of cent cost keys numbered progressively, other magazines for coins, means controlled by said cent keys for withholding a predetermined coin in one of said first named magazines when other coins are to be ejected from said first named magazines and for simultaneously substituting and ejecting instead of the withheld coin, coins from said other magazines, the value of the substituted coins depending upon the number of said cent keys.

72. In a machine for making change, in combination, a division of magazines for holding a plurality of coins of different denominations, said denominations aggregating one dollar, one of said magazines operating to hold dimes, a plurality of cent keys numbered progressively, a second division of magazines, to hold coins of different denominations, ejecting devices for all of said magazines including an ejecting device for said dime magazines, means controlled by said cent keys for inhibiting the ejecting device of said dime magazine to withhold a dime, and means controlled by the same key for actuating certain ejecting mechanisms of the magazines of said second division to substitute coins of less value than one dime from said second division of magazines for the withheld dime.

73. In a machine for making change, in combination, a plurality of magazines for holding coins of different denominations so that a sum composed of one coin from each of said magazines will aggregate one dollar, a plurality of keys, a plurality of substantially parallel bars corresponding to said keys, ejecting devices corresponding to the magazines, clutches for controlling said ejecting devices pivoted shift bars for actuating said clutches disposed transversely of said first named bars and swinging in a plane parallel to the plane in which said first named bars collectively lie, said ejecting devices normally set to eject one dollar in coins from said magazines, means for actuating said shift bars by said first named bars by depressing said keys to open certain of said clutches, and means for actuating the ejecting devices corresponding to the remainder of said clutches.

74. In a machine for making change, in combination, a plurality of magazines for coins of different denominations so that a sum composed of a coin from each of said magazines will aggregate one dollar, a plurality of ejecting mechanisms for said magazines, a shaft, a plurality of clutches corresponding to said ejecting mechanisms, a plurality of said clutches normally remaining closed, each clutch comprising a relatively fixed clutch member rigid with said shaft and a relatively movable clutch member mounted to slide on said shaft, a plurality of keys, a plurality of substantially parallel bars actuated by said keys, transverse movable bars actuated by said parallel bars and connected with the movable clutch members to actuate the same, means for actuating said ejecting mechanisms through said clutches when the same are in a closed condition, and means for returning said transverse movable bars to their normal position after said ejecting mechanisms have been actuated.

75. In a machine for making change, in combination, a plurality of magazines for coins of different denominations so that the sum composed of a coin from each of said magazines will aggregate one dollar, a plurality of ejecting mechanisms therefor, a plurality of normally closed clutches corresponding to said ejecting mechanisms for normally ejecting one dollar in coins from said magazines, a plurality of keys, said clutches each comprising a relatively fixed clutch member and a laterally movable clutch member coöperating therewith, transversely disposed pivoted arms actuated by said bars and connected with the movable clutch members to open and close each clutch, means for actuating said ejecting mechanisms through said clutches, and means for returning said pivoted arms to their normal position after said ejecting mechanisms have been actuated.

76. In a machine for making change, in combination, a plurality of fixed magazines of different denominations so that a sum composed of a coin from each of said magazines will aggregate one dollar, said magazines including a dime magazine, ejecting mechanisms corresponding to said magazines, normally set to eject a coin from each of said magazines and including a dime ejecting mechanism for the dime magazine, a plurality of cent cost keys, means actuated thereby for controlling said dime ejecting mechanism and including a movable member moved in common by all of said keys, other magazines for coins constituting a second division, ejecting devices therefor also controlled by said keys so that said keys may control the dime ejecting mechanism to prevent the ejection of a dime from said dime magazine and thereby withhold a dime, and controlling the ejecting mechanisms of said second division of magazines to substitute other coins of less value than a dime for the dime withheld, means for actuating said ejecting mechanisms, and means for returning said movable member to its normal position after said ejecting mechanisms have been actuated.

In testimony whereof I have hereunto set my hand in presence of two subscribing witnesses.

ROBERT J. REGAN.

Witnesses:
 ROGER CHEW,
 JOHN HERBER.